(12) United States Patent
Lee

(10) Patent No.: US 9,304,288 B2
(45) Date of Patent: Apr. 5, 2016

(54) PHOTOGRAPHING LENS AND PHOTOGRAPHING APPARATUS

(71) Applicant: SAMSUNG ELECTRONICS CO., LTD., Suwon-si, Gyeonggi-do (KR)

(72) Inventor: Tae-youn Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/771,369

(22) Filed: Feb. 20, 2013

(65) Prior Publication Data

US 2014/0029113 A1    Jan. 30, 2014

(30) Foreign Application Priority Data

Jul. 25, 2012    (KR) .................. 10-2012-0081437

(51) Int. Cl.
*G02B 9/60*    (2006.01)
*G02B 3/04*    (2006.01)
*G02B 13/00*   (2006.01)

(52) U.S. Cl.
CPC .. *G02B 9/60* (2013.01); *G02B 3/04* (2013.01); *G02B 13/0045* (2013.01)

(58) Field of Classification Search
CPC ......... G02B 9/40; G02B 9/60; G02B 13/0045
USPC ................. 359/713–714, 749–753, 757–758, 359/763–766
See application file for complete search history.

(56) References Cited

U.S. PATENT DOCUMENTS

| 4,080,048 | A | * | 3/1978 | Kimura .................. 359/750 |
| 7,110,188 | B2 | | 9/2006 | Matsui et al. |
| 7,218,457 | B2 | * | 5/2007 | Sensui .................... 359/686 |
| 7,580,206 | B2 | * | 8/2009 | Chang .................... 359/793 |
| 7,830,620 | B2 | | 11/2010 | Asami |
| 7,903,348 | B2 | | 3/2011 | Sensui |
| 7,957,074 | B2 | | 6/2011 | Asami |
| 8,023,198 | B2 | | 9/2011 | Masugi |
| 2001/0022698 | A1 | * | 9/2001 | Sato ...................... 359/733 |
| 2002/0048091 | A1 | | 4/2002 | Sato |
| 2005/0200968 | A1 | | 9/2005 | Nose et al. |
| 2005/0200969 | A1 | | 9/2005 | Nose et al. |

(Continued)

FOREIGN PATENT DOCUMENTS

CN    202049277 U    11/2011
CN    202217102 U    5/2012

(Continued)

OTHER PUBLICATIONS

Partial European Search Report established for EP 13156844.6 (Nov. 4, 2013).

(Continued)

*Primary Examiner* — Jordan Schwartz
(74) *Attorney, Agent, or Firm* — Drinker Biddle & Reath LLP

(57) ABSTRACT

A photographing lens and a photographing apparatus including the photographing lens. The photographing lens includes a first lens, a second lens, a third lens, a fourth lens, and a fifth lens that are arranged sequentially from an object side. The first lens has a concave surface toward the object side and has a positive refractive power, and the second lens is formed with a meniscus shape having a concave surface toward an image side and has a negative refractive power.

18 Claims, 21 Drawing Sheets

(56) References Cited

U.S. PATENT DOCUMENTS

| | | |
|---|---|---|
| 2005/0200970 A1 | 9/2005 | Nose et al. |
| 2005/0200972 A1 | 9/2005 | Nose et al. |
| 2005/0259157 A1 | 11/2005 | Keiichi |
| 2006/0007561 A1 | 1/2006 | Suzuki |
| 2006/0018033 A1 | 1/2006 | Masui et al. |
| 2006/0285227 A1 | 12/2006 | Kobayashi |
| 2010/0103538 A1 | 4/2010 | Kitahara |
| 2010/0220229 A1 | 9/2010 | Sano |
| 2010/0254029 A1 | 10/2010 | Shinohara |
| 2011/0169974 A1 | 7/2011 | Take et al. |
| 2011/0176227 A1 | 7/2011 | Tsai |
| 2012/0127359 A1 | 5/2012 | Chen et al. |
| 2012/0229917 A1 | 9/2012 | Huang |
| 2013/0003193 A1 | 1/2013 | Huang |
| 2013/0182339 A1* | 7/2013 | Sekine et al. ............... 359/764 |
| 2013/0215301 A1* | 8/2013 | Huang ............... 348/294 |
| 2013/0235463 A1* | 9/2013 | Chen et al. ............... 359/648 |
| 2014/0192423 A1* | 7/2014 | Kondo et al. ............... 359/714 |

FOREIGN PATENT DOCUMENTS

| | | | |
|---|---|---|---|
| JP | 11-160631 | * | 6/1999 |
| JP | 2004-341376 A | | 12/2001 |
| JP | 2002-072095 A | | 3/2002 |
| JP | 2002-131631 A | | 5/2002 |
| JP | 2002-162562 A | | 6/2002 |
| JP | 2003-075720 A | | 3/2003 |
| JP | 2005-024969 A | | 1/2005 |
| JP | 2005-164653 A | | 6/2005 |
| JP | 2005-164839 A | | 6/2005 |
| JP | 2005-258057 A | | 9/2005 |
| JP | 2005-258059 A | | 9/2005 |
| JP | 2005-258064 A | | 9/2005 |
| JP | 2005-258067 A | | 9/2005 |
| JP | 2005-352060 A | | 12/2005 |
| JP | 2005-352240 A | | 12/2005 |
| JP | 2006-030824 A | | 2/2006 |
| JP | 2007-025653 A | | 2/2007 |
| JP | 2009-237542 A | | 10/2009 |
| JP | 2009-251210 A | | 10/2009 |
| JP | 2009-265171 A | | 11/2009 |
| JP | 2009-288300 A | | 12/2009 |
| JP | 2010-072276 A | | 4/2010 |
| JP | 2010-091697 A | | 4/2010 |
| JP | 2010-107531 A | | 5/2010 |
| JP | 2010-262269 A | | 11/2010 |
| TW | 2012-24506 A | * | 6/2012 |
| WO | WO 2004/107009 A1 | | 12/2004 |

OTHER PUBLICATIONS

Extended European Search Report issued for EP 13156844.6 (Apr. 3, 2014).

* cited by examiner

PHOTOGRAPHING LENS AND PHOTOGRAPHING APPARATUS

CROSS-REFERENCE TO RELATED PATENT APPLICATION

This application claims the benefit of Korean Patent Application No. 10-2012-0081437, filed on Jul. 25, 2012, in the Korean Intellectual Property Office, the disclosure of which is incorporated herein in its entirety by reference.

BACKGROUND

The invention relates to a photographing lens that is bright and has a wide angle, and a photographing apparatus including the photographing lens.

Photographing apparatuses that use a solid state image sensor such as a charge coupled device (CCD) type image sensor or a complementary metal-oxide semiconductor (CMOS) type image sensor are now very popular. Such a photographing apparatus may be a digital still camera, a video camera, or a single lens reflex camera. In addition, a photographing apparatus using a solid state image sensor is suitable for minimization, and thus, can be implemented in small-sized devices such as mobile phones. Users of photographing apparatuses demand high performance such as high resolution and a wide angle. Also, users who have a professional knowledge in regard to cameras are increasing.

SUMMARY

An embodiment provides a small-sized photographing lens having a wide angle.

Another embodiment provides a photographing apparatus including a small-sized photographing lens having a wide angle.

According to an embodiment, there is provided a photographing lens including: a first lens, a second lens, a third lens, a fourth lens, and a fifth lens that are arranged sequentially from an object side, wherein the first lens has a concave surface toward the object side and has a positive refractive power, and the second lens is formed with a meniscus shape having a concave surface toward an image side and has a negative refractive power.

The first lens may satisfy the following inequality:

$$3.0 < |R1/f| < 800,$$

where R1 denotes the radius of curvature of the first lens around an optical axis, and f denotes the focal length of the photographing lens.

The first lens may satisfy the following inequality:

$$7.0 < |R1/R2| < 1200,$$

where R1 denotes the radius of curvature of the object side surface of the first lens around the optical axis, and R2 denotes the radius of curvature of the image side surface of the first lens around the optical axis.

The second lens may satisfy the following inequality:

$$0.25 < R4/f < 0.3,$$

where R4 denotes the radius of curvature of the image side surface of the second lens around the optical axis, and f denotes the focal length of the photographing lens.

The third lens may have a negative refractive power, the fourth lens may have a positive refractive power, and the fifth lens may have a negative refractive power.

The fourth lens may be a meniscus lens having a convex surface toward the image side.

The fifth lens may have at least one aspherical lens and has an image side surface that is concave around the optical axis.

The photographing lens may satisfy the following inequality:

$$vd1 > 50,$$

where vd1 denotes an Abbe's number of the first lens with respect to a d-line.

The photographing lens may satisfy the following inequalities:

$$20 < vd2 < 30 \text{ and}$$

$$vd4 > 50,$$

where vd2 denotes an Abbe's number of the second lens with respect to the d-line, and vd4 denotes an Abbe's number of the fourth lens with respect to the d-line.

The photographing lens may satisfy the following inequality:

$$0.7 < f/f1 < 1.5,$$

where f denotes the focal length of the photographing lens, and f1 denotes the focal length of the first lens.

The photographing lens may satisfy a following inequality:

$$0.9 < TL/f < 2.0,$$

where f denotes the focal length of the photographing lens and TL denotes the distance from the first lens to the image side.

The photographing lens may satisfy the following inequality:

$$1.51 < N1 < 1.56,$$

where N1 denotes the refractive index of the first lens with respect to the d-line.

The photographing lens may satisfy the following inequality:

$$1.58 < N2 < 1.66,$$

where N2 denotes the refractive index of the second lens with respect to the d-line.

The photographing lens may satisfy the following inequality:

$$1.51 < N4 < 1.56,$$

where N4 denotes the refractive index of the fourth lens with respect to the d-line.

The first through fifth lenses may be formed as plastic lenses.

The photographing lens may have an F number ranging from 1.8 to 2.8.

The photographing lens may have an angle of view ranging from 70° to 85°.

An aperture stop may be disposed on the object side or the image side of the first lens.

Each of the first through fifth lenses may have at least one aspherical shape.

BRIEF DESCRIPTION OF THE DRAWINGS

The above and other features and advantages will become more apparent from the following detailed description of exemplary embodiments with reference to the attached drawings in which.

DETAILED DESCRIPTION

Hereinafter, a photographing lens and a photographing apparatus including the photographing lens according to various embodiments will be described in detail with reference to accompanying drawings. Expressions such as "at least one of," when preceding a list of elements, modify the entire list of elements and do not modify the individual elements of the list.

Figure 1:
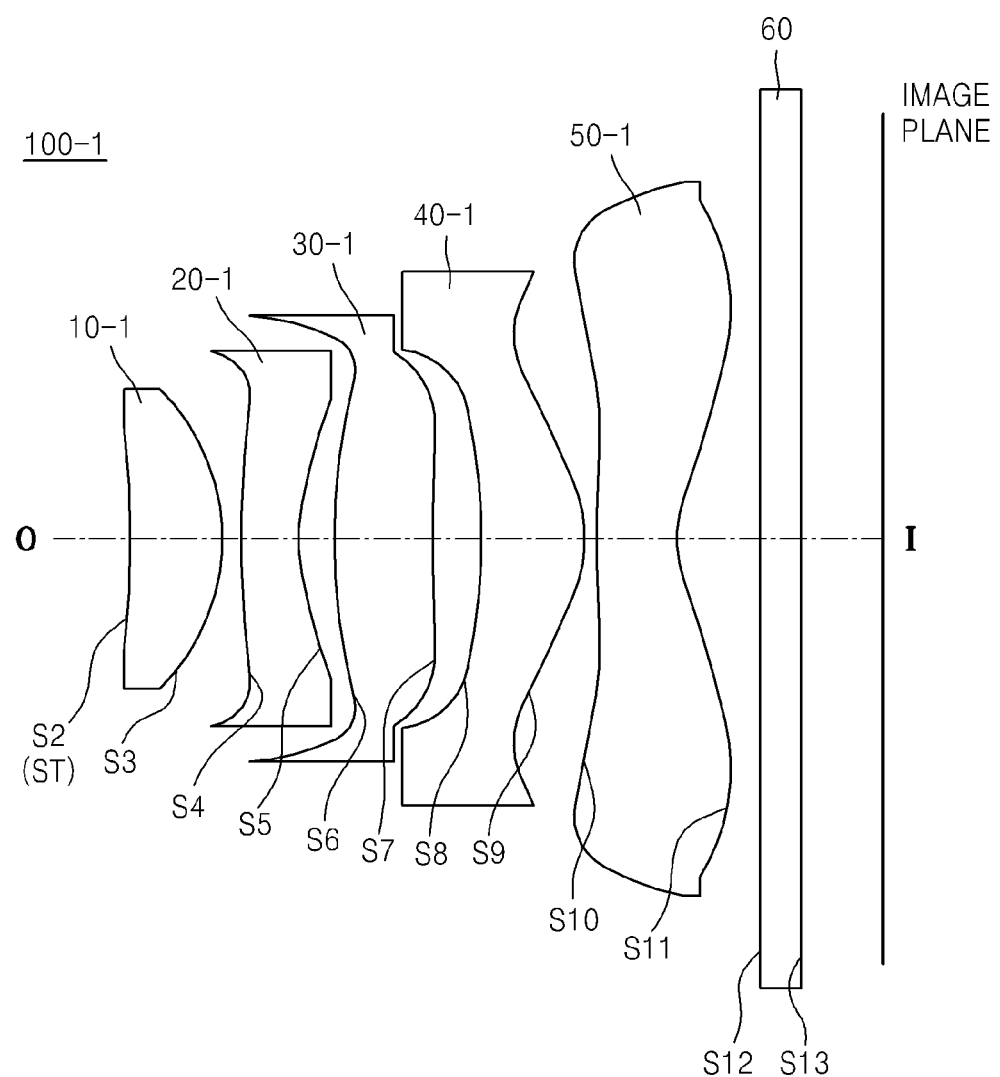
FIG. 1 is a diagram showing a photographing lens according to an embodiment.

FIG. 1 is a diagram showing a photographing lens 100-1 according to an embodiment. The photographing lens 100-1 includes a first lens 10-1, a second lens 20-1, a third lens 30-1, a fourth lens 40-1, and a fifth lens 50-1 arranged in order from an object side O to an image side I.

The first lens 10-1 may have a positive refractive power, and a concave surface toward the object side O. In addition, for example, the first lens 10-1 may have a convex surface toward the image I side. The second lens 20-1 may be a meniscus lens having a negative refractive power and a concave surface toward the image side I.

By forming the first lens 10-1 and the second lens 20-1 having the above configurations, a wide angle may be realized. For example, the photographing lens 100-1 may have a viewing angle ranging from 70° to 85°.

The photographing lens 100-1 may be slim and compact by including five lenses, and may be applied to a small-sized camera, for example, a camera for notebook computers, a camera for personal computers (PCs), a small pocket-size camcorder, and a camera for mobile phones. The first through fifth lenses 10-1, 20-1, 30-1, 40-1, and 50-1 may have positive, negative, negative, positive, and negative refractive powers, respectively.

The third lens 30-1 may have a positive or negative refractive power. The fourth lens 40-1 may be a meniscus lens having a convex surface toward the image side I. The fifth lens 50-1 may have an image side surface that is concave around an optical axis. The photographing lens 100-1 may include at least one aspherical lens. For example, each of the first through fifth lenses 10-1, 20-1, 30-1, 40-1, and 50-1 may have one aspherical shape.

The first lens 10-1 may be configured to satisfy the following inequalities:

$$3.0 < |R1/f1| < 800 \quad (1)$$

$$7.0 < R1/R2 < 1200 \quad (2)$$

where R1 denotes the radius of curvature of the object side surface of the first lens 10-1 around the optical axis, R2 denotes the radius of curvature of the image side surface of the first lens 10-1 around the optical axis, and f denotes the focal length of the photographing lens 100-1. The inequality 1 represents a relationship between the radius of curvature of the object side surface of the first lens 10-1 and the focal length. When the value of (R1/f) is equal to or less than the lowest limit, the refractive power of the object side surface S2 of the first lens 10-1 is reduced, thereby increasing coma aberration and astigmatism. Also, the refractive power of the image side surface S3 of the first lens 10-1 may be increased in order to correct the increased aberration, and thus, sensitivity of the image side surface S3 of the first lens 10-1, for example, comatic flare due to decentering, may be increased. If the value of (R1/f) exceeds the uppermost limit, the refractive power of the object side surface S2 of the first lens 10-1 is increased, and thus, off-axis aberration (coma aberration and astigmatism) may be increased. When the inequality 1 is satisfied, a wide angle may be realized while satisfying the coma aberration and the astigmatism, and the off-axis aberration (coma aberration and astigmatism) caused due to a bright lens (low F number) may be controlled.

The inequality 2 represents a ratio between the radii of curvature of the object side surface S2 and the image side surface S3 of the first lens 10-1, thereby balancing the refractive powers of the first lens 10-1 and the second lens 20-1. If the refractive power of one of the two surfaces of the first lens 10-1 is strong, the refractive power of the other surface may be relatively weak. The sensitivity of the surface having relatively strong refractive power increases, thereby degrading mass producibility. When the value of (R1/R2) satisfies the inequality 2, the coma aberration and the astigmatism may be satisfied while realizing a bright lens and a wide angle.

For example, the photographing lens 100-1 may have an F number ranging from 1.8 to 2.8.

The second lens 20-1 may satisfy the following inequality:

$$0.25 < R4/f < 1.3 \quad (3)$$

where R4 denotes the radius of curvature of an image side surface of the second lens 20-1 around the optical axis, and f denotes the focal length of the photographing lens. The above inequality 3 ensures the radius of curvature of the image side surface of the second lens 20-1 is maintained appropriately. If an angle of light that is incident on the image side surface of the second lens 20-1 is large, field curvature increases, thereby affecting the sensitivity of the entire optical system. If the value of R4/f is equal to or less than the lowest limit, the refractive power of the image side surface of the second lens becomes excessively large, and the exit angle of light from the image side surface of the second lens increases. If the value of R4/f is equal to or greater than the uppermost limit, the refractive power is reduced and the coma aberration that is the off-axis aberration increases, and accordingly, it is difficult to adjust the incident angle and the exit angle of the image side surface of the second lens 20-1 and to prevent the coma aberration from occurring.

The first through fifth lenses 10-1, 20-1, 30-1, 40-1, and 50-1 may be formed as plastic lenses. For example, the first lens 10-1 may satisfy the following inequality:

$$vd1 > 50 \quad (4)$$

where vd1 denotes an Abbe's number with respect to a d-line of the first lens 10-1 (wavelength: C-line 656.3 nm, d-line 587.6 nm, e-line 546.1 nm, g-line 435.8 nm, F-line 486.1 nm).

The second lens 20-1 may satisfy the following inequality:

$$20 < vd2 < 30 \tag{5}$$

where vd2 denotes an Abbe's number with respect to the d-line of the second lens 20-1. The inequality 5 relates to the Abbe's number of the second lens 20-1, and may reduce chromatic aberration that is required to realize high resolution by correcting longitudinal chromatic aberration due to a difference between the Abbe's number of the first lens having positive refractive power and the Abbe's number of the second lens 20-1 having negative refractive power. For high resolution, the sensor size becomes greater, and accordingly, aberration increases, and as the pixel size becomes smaller, longitudinal chromatic aberration has to be corrected more significantly than at a lower resolution. According to the present embodiment, the longitudinal chromatic aberration is corrected by using the lower Abbe's number of the second lens 20-1, and thus, center chromatic flare may be reduced.

The fourth lens 40-1 may satisfy the following inequality:

$$vd4 > 50 \tag{6}$$

where vd4 denotes an Abbe's number of the fourth lens 40-1 with respect to the d-line.

The photographing lens 100-1 may have a compact size by satisfying the following inequalities:

$$0.7 < f/f1 < 1.5 \tag{7}$$

$$0.9 < TL/f < 2.0 \tag{8}$$

where f denotes the focal length of the photographing lens 100-1, f1 denote the focal length of the first lens 10-1, and TL denotes the distance from the first lens 10-1 to the image side I.

The above inequality 7 defines the refractive power of the first lens 10-1. That is, if the value of (f/f1) is equal to or less than the lowest limit, the refractive power of the first lens 10-1 is increased, and aberration is generated by the first lens 10-1 (spherical aberration, coma aberration, and astigmatism), and it may be difficult to realize a wide angle. If the value of (f/f1) is equal to or greater than the uppermost limit, the refractive power of the first lens 10-1 is reduced, and thus, the entire length of the first lens 10-1 is increased. Therefore, when the inequality 7 is satisfied, the off-axis aberration may be controlled while satisfying the entire length of the photographing lens 100-1, thereby obtaining performance suitable for the high resolution.

The inequality 8 represents a ratio between the distance from the first lens 10-1 to the image side I and the focal length of the photographing lens 100-1, and the focal length of the photographing lens 100-1 has to be short in order to realize the wide angle. However, if the focal length is too short, the off-axis aberration (coma aberration and astigmatism) increases greatly, and the sensitivity also increases greatly. If a value of (TL/f) is equal to or less than the lowest limit, the focal length of the photographing lens 100-1 is increased, and thus, it is difficult to realize a wide angle. If the value of (TL/f) is equal to or greater than the uppermost limit, the off-axis coma aberration and the astigmatism are greatly increased, thereby affecting image quality of the photographing lens 100-1, and thus, it may not be suitable for a high resolution lens.

The photographing lens 100-1 may satisfy the following inequalities:

$$1.51 < N1 < 1.56 \tag{9}$$

$$1.58 < N2 < 1.66 \tag{10}$$

$$1.51 < N4 < 1.56 \tag{11}$$

where N1 denotes the refractive index of the first lens 10-1 with respect to the d-line, N2 denotes the refractive index of the second lens 20-1 with respect to the d-line, and N4 denotes the refractive index of the fourth lens 40-1 with respect to the d-line. When the first lens 10-1, the second lens 20-1, and the fourth lens 40-1 are formed of a material satisfying the inequalities 9, 10, and 11, manufacturing costs may be reduced and the lenses may be fabricated more easily.

An aspherical surface used in the photographing lens according to an embodiment may be defined as follows.

Here, Z denotes the distance from an apex of the lens in an optical axis direction, Y denotes the distance in a direction perpendicular to the optical axis, K denotes a conic constant, A, B, C, D, E, and F denote deformation terms, and c denotes a reciprocal of the radius of curvature at the apex of the lens (1/R).

$$Z = \frac{cY^2}{1 + \sqrt{1 - (1+K)c^2Y^2}} + \tag{12}$$

$$AY^4 + BY^6 + CY^8 + DY^{10} + EY^{12} + FY^{14} + \ldots$$

The photographing lens is realized through the various embodiments described below. Hereinafter, the focal lengths are represented in units of mm, the viewing angle is represented in units of degrees, and * denotes an aspherical surface. In the drawings showing the embodiments, at a side closest to the image I, at least one filter 60 may be disposed. For example, the filter 60 may include at least one of a Low-pass Filter, an IR-Cut Filter, and a cover glass. However, the photographing lens may be configured without the filter.

First Embodiment

FIG. 1 shows the photographing lens 100-1 according to the present embodiment, and the following table shows design data of the first embodiment. In FIG. 1, reference numerals of lens surfaces in each of the lenses are shown; however, the reference numerals of the lens surfaces may be omitted in other drawings showing other embodiments.

In the first embodiment, the focal length of the first lens 10-1 is 3.1867 mm, the focal length of the second lens 20-1 is −4.1055 mm, the focal length of the third lens 30-1 is 12.1540 mm, the focal length of the fourth lens 40-1 is 1.9891 mm, and the focal length of the fifth lens 50-1 is −1.92 mm. An aperture stop ST may be located on the object side surface of the first lens 10-1.

| Lens surface | Radius of curvature | Thickness | Refractive index (nd) | Abbe's number (vd) |
|---|---|---|---|---|
| S1 | infinity | 0.000 | | |
| S2(ST)* | −46.310 | 0.682 | 1.531 | 56.51 |
| S3* | −1.645 | 0.131 | | |
| S4* | 3.954 | 0.420 | 1.651 | 21.53 |
| S5* | 1.537 | 0.262 | | |
| S6* | 4.020 | 0.710 | 1.531 | 56.51 |
| S7* | 9.969 | 0.341 | | |
| S8* | −3.955 | 0.752 | 1.531 | 56.51 |
| S9* | −0.890 | 0.087 | | |
| S10* | 6.764 | 0.586 | 1.531 | 56.51 |
| S11* | 0.861 | 0.360 | | |
| S12 | infinity | 0.300 | 1.517 | 64.20 |
| S13 | infinity | 0.818 | | |
| img | infinity | 0.010 | | |

*denotes an aspherical surface, img denotes an image side, and the conic constant K and the deformation terms A, B, C, D, E, and F are as follows.

| Lens surface | K | A | B | C | D | E | F |
|---|---|---|---|---|---|---|---|
| S2 | 0.0000E+00 | −8.0253E−02 | −5.8784E−02 | 4.3072E−02 | −6.3409E−02 | | |
| S3 | 0.0000E+00 | 4.4557E−02 | −1.2640E−01 | 1.1003E−01 | −5.7058E−02 | | |
| S4 | 0.0000E+00 | −4.5783E−02 | −2.1982E−02 | 3.1510E−02 | −2.5065E−02 | | |
| S5 | 0.0000E+00 | −1.8153E−01 | 9.5282E−02 | −6.4564E−02 | 5.4469E−03 | | |
| S6 | 0.0000E+00 | −4.8835E−02 | 2.1646E−02 | 2.4565E−02 | −1.8138E−02 | | |
| S7 | 0.0000E+00 | −3.5400E−02 | −4.2536E−02 | 0.0000E+00 | 0.0000E+00 | | |
| S8 | 0.0000E+00 | 4.9620E−02 | 2.7144E−02 | −1.1151E−01 | 6.8080E−02 | −2.1362E−02 | |
| S9 | −3.7684E+00 | −5.0136E−02 | 7.9252E−02 | −3.7098E−02 | 9.8133E−03 | −1.0423E−03 | |
| S10 | 0.0000E+00 | −1.0316E−01 | 3.5685E−02 | −6.2730E−03 | 5.0182E−04 | | |
| S11 | −5.5863E+00 | −8.0827E−02 | 3.5700E−02 | −1.0827E−02 | 2.0105E−03 | −2.0879E−04 | 9.0077E−06 |

Figure 2:
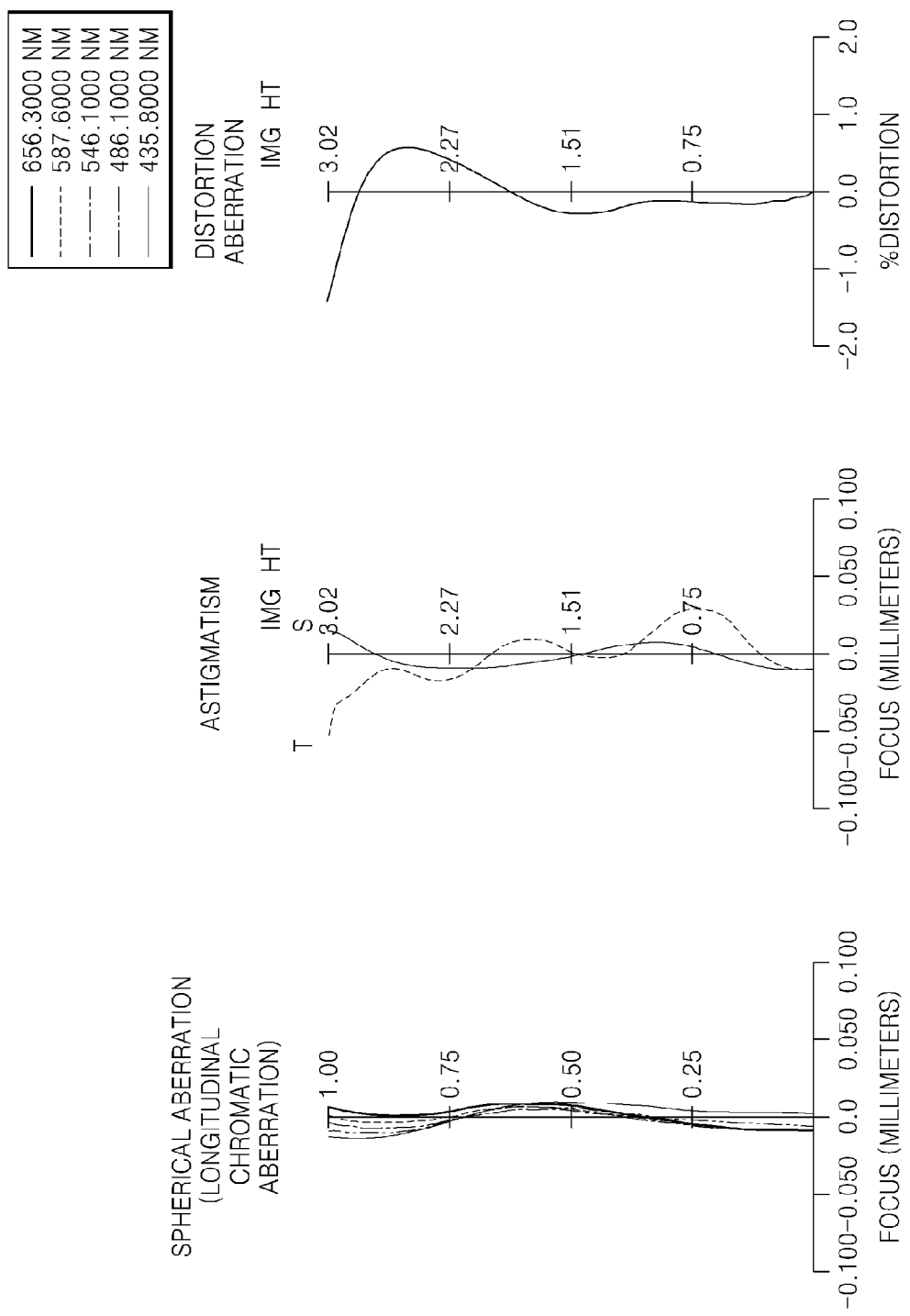
FIG. 2 is a diagram showing a longitudinal aberration of the photographing lens of FIG. 1.
Figure 3:
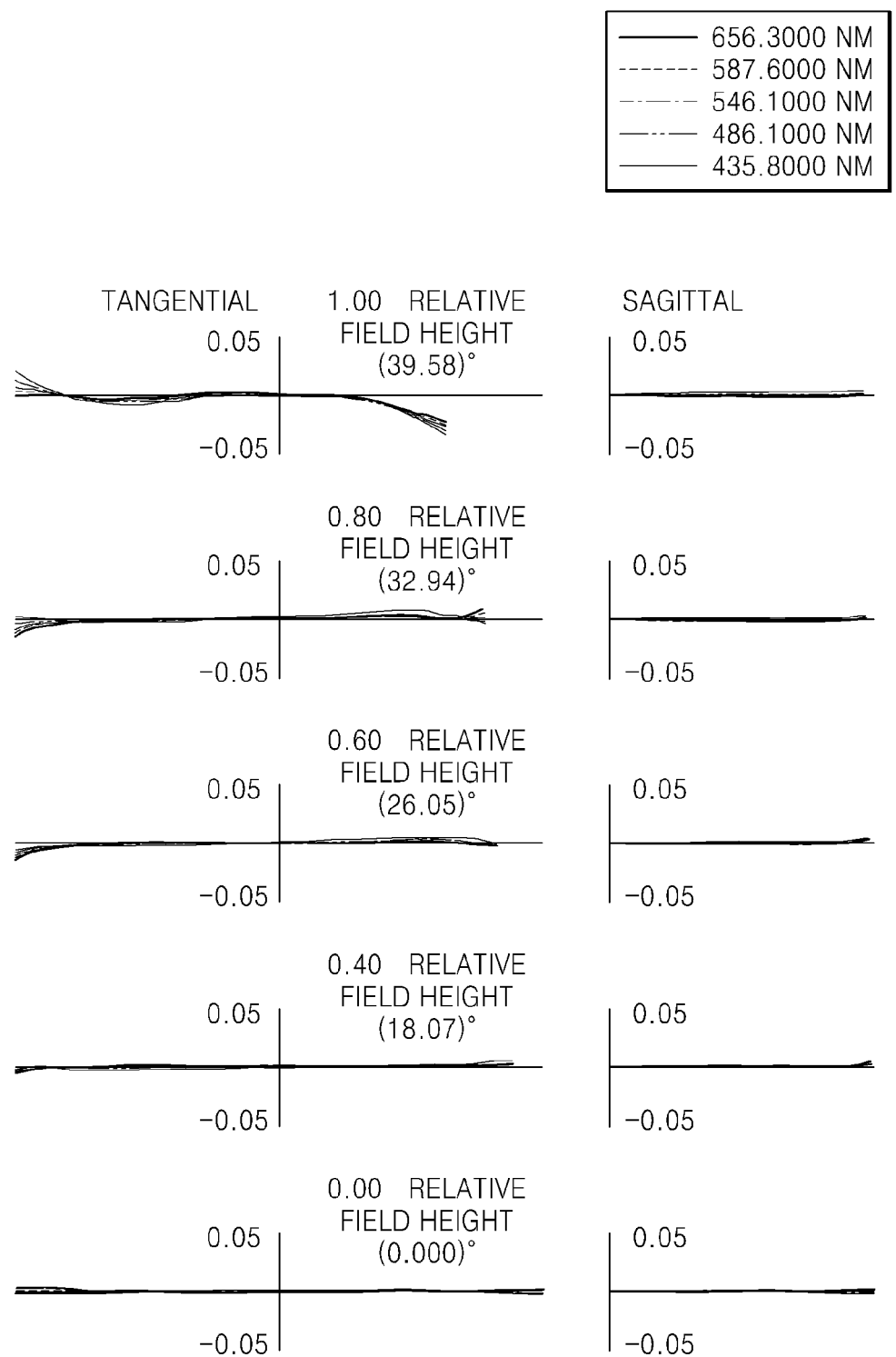
FIG. 3 is a diagram showing a coma aberration of the photographing lens of FIG. 1.

FIG. 2 shows the longitudinal spherical aberration, astigmatic field curvature, and distortion of the photographing lens 100-1 according to the first embodiment. Tangential field curvature (T) and sagittal field curvature (S) are shown as the astigmatic field curvature. FIG. 3 shows the coma aberration of the photographing lens according to the first embodiment.

Second Embodiment

Figure 4:
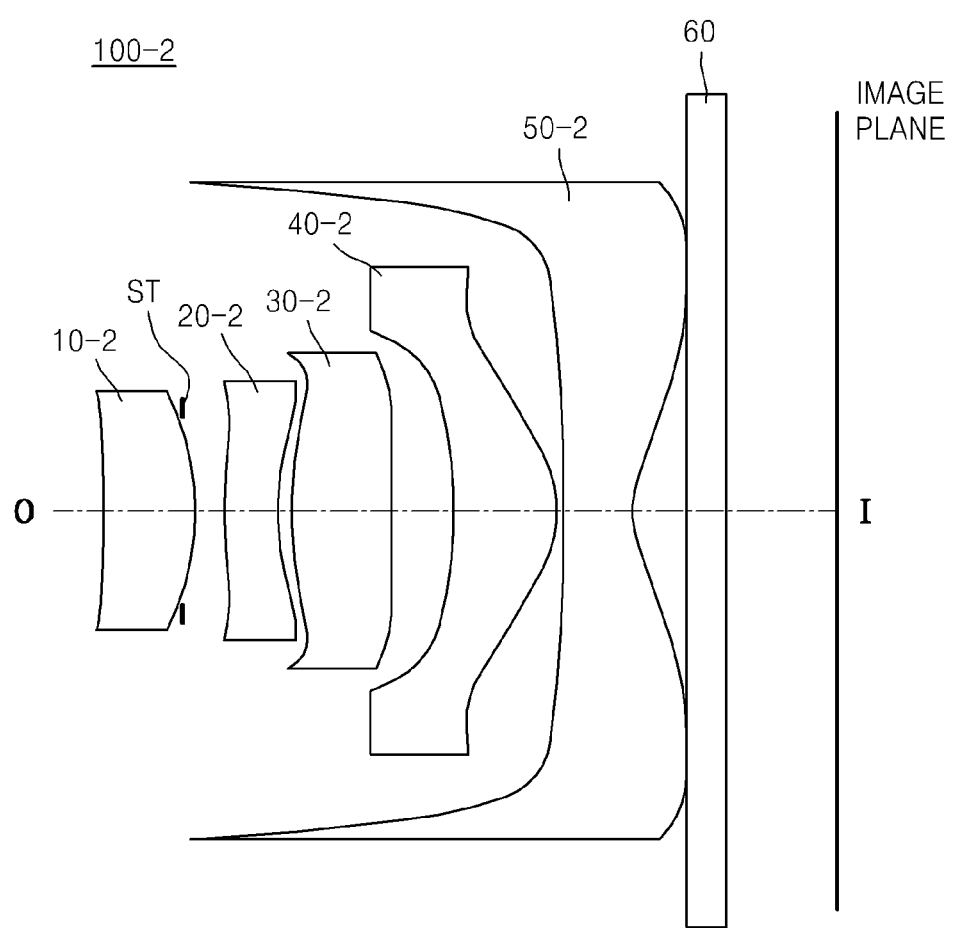
FIG. 4 is a diagram showing a photographing lens according to another embodiment.

FIG. 4 shows a photographing lens 100-2 according to a second embodiment, and the following table shows design data of the second embodiment.

In the second embodiment, the focal length of the first lens 10-2 is 4.1124 mm, the focal length of the second lens 20-2 is −4.2148 mm, the focal length of the third lens 30-2 is 6.3050 mm, a focal length of the fourth lens 40-2 is 1.5879 mm, and the focal length of the fifth lens 50-2 is −1.5593 mm. An aperture stop ST may be located on the image side surface of the first lens 10-2.

| | Radius of curvature | Thickness | Refractive index (nd) | Abbe's number (vd) |
|---|---|---|---|---|
| S1 | infinity | 0.000 | | |
| S2* | −137.814 | 0.699 | 1.531 | 56.51 |
| S3(ST)* | −2.158 | 0.227 | | |
| S4* | 5.129 | 0.400 | 1.632 | 23.3 |
| S5* | 1.711 | 0.111 | | |
| S6* | 2.786 | 0.756 | 1.531 | 56.51 |
| S7* | 14.853 | 0.479 | | |
| S8* | −4.706 | 0.781 | 1.531 | 56.51 |
| S9* | −0.758 | 0.040 | | |
| S10* | 40.997 | 0.546 | 1.531 | 56.51 |
| S11* | 0.810 | 0.411 | | |
| S12 | infinity | 0.300 | 1.517 | 64.20 |
| S13 | infinity | 0.840 | | |
| Img | infinity | 0.010 | | |

The following table shows a conic constant K, and deformation terms A, B, C, D, E, and F.

Figure 5:
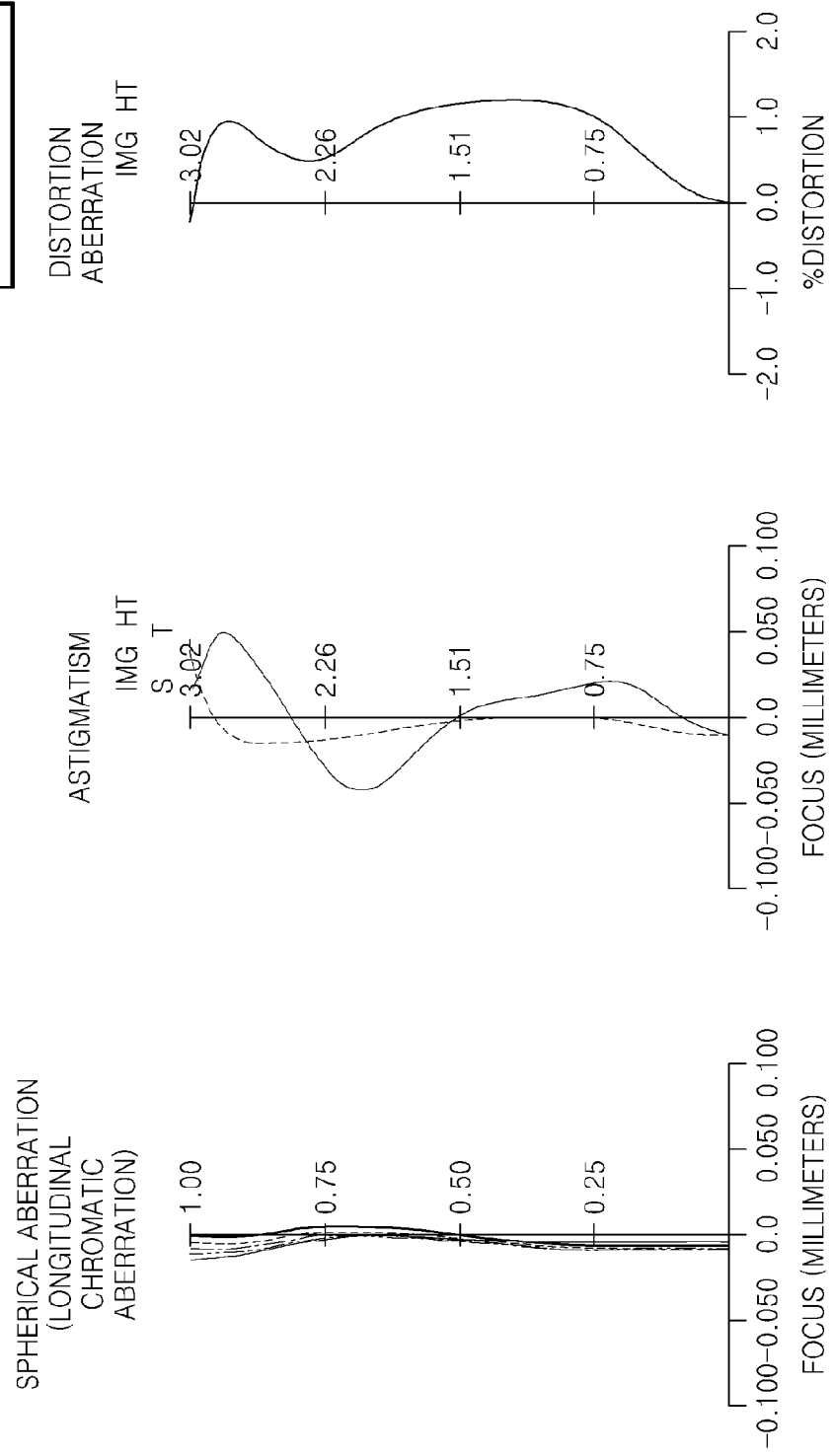
FIG. 5 is a diagram showing a longitudinal aberration of the photographing lens of FIG. 4.
Figure 6:
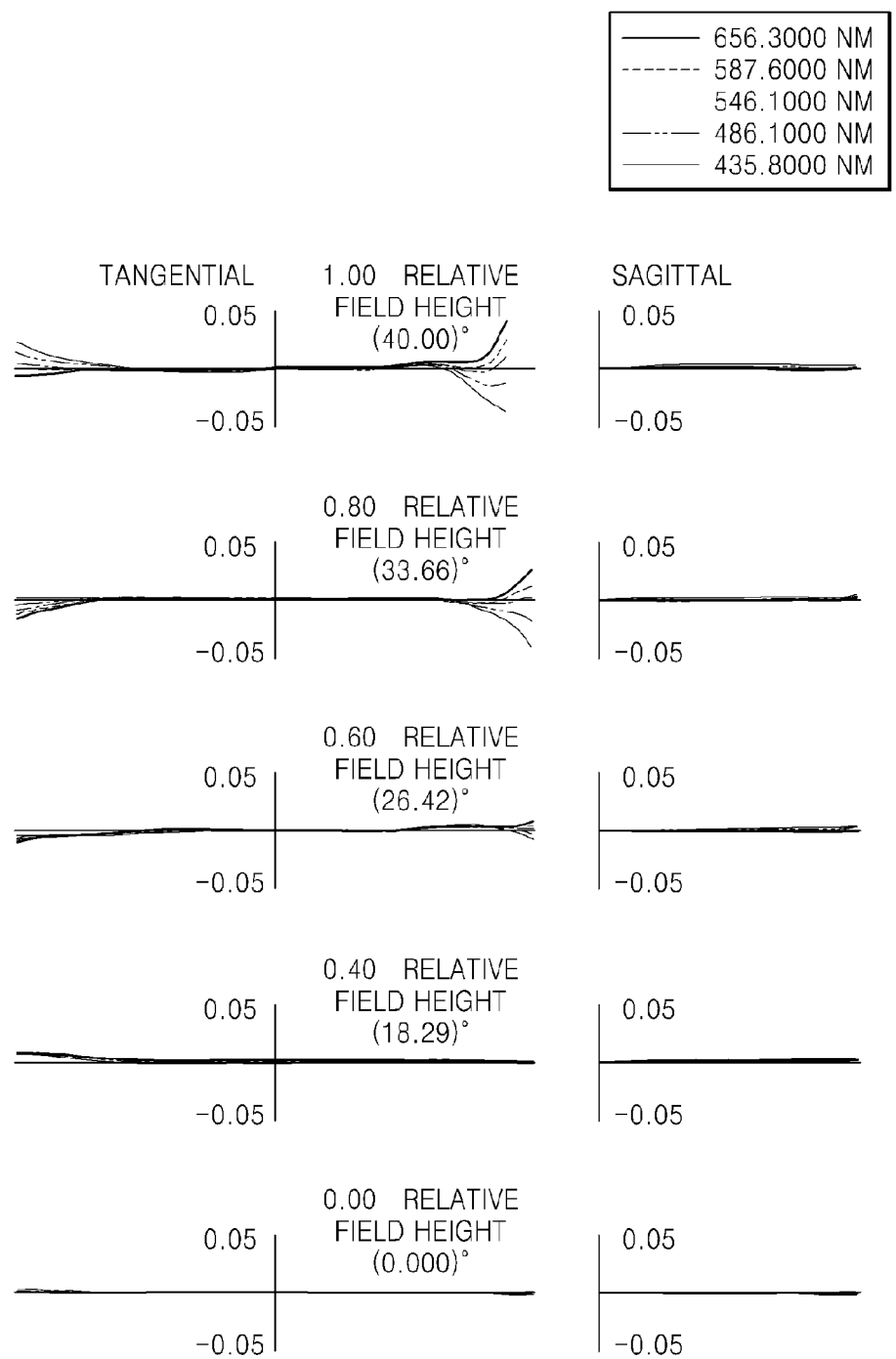
FIG. 6 is a diagram showing a coma aberration of the photographing lens of FIG. 4.

FIG. 5 shows the longitudinal spherical aberration, astigmatic field curvature, and distortion of the photographing lens 100-2 according to the second embodiment. Tangential field curvature (T) and sagittal field curvature (S) are shown as the astigmatic field curvature. FIG. 6 shows the coma aberration of the photographing lens according to the second embodiment.

Third Embodiment

Figure 7:
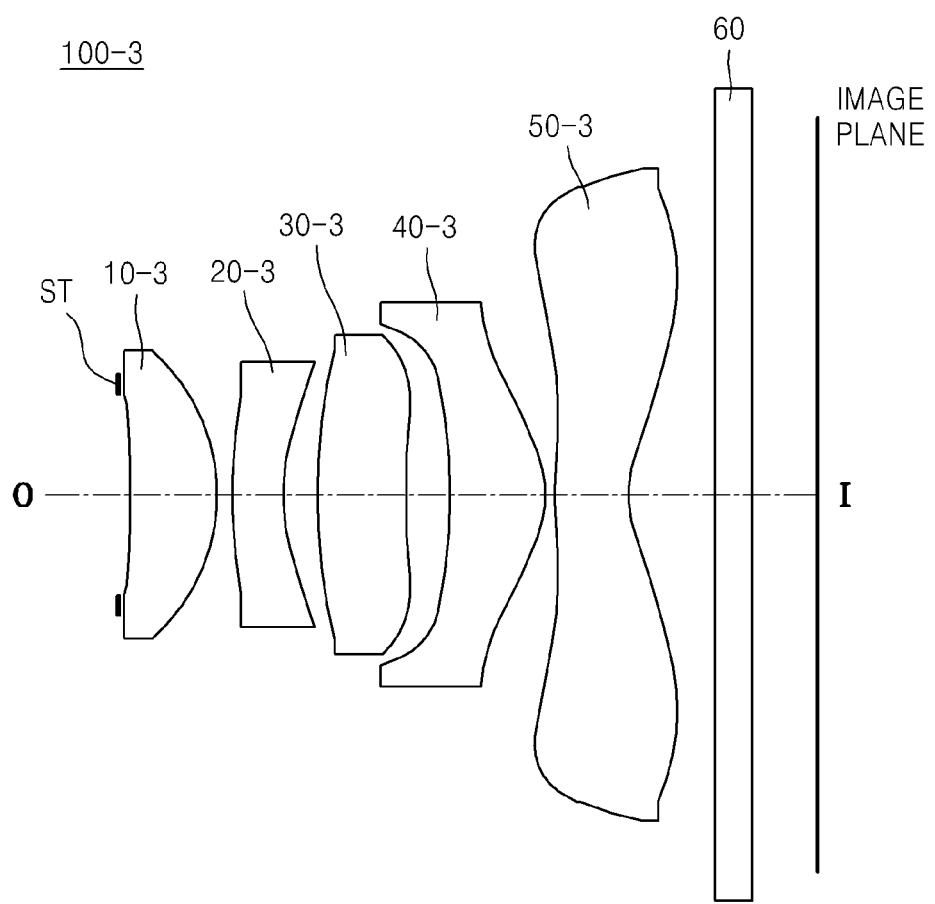
FIG. 7 is a diagram showing a photographing lens according to another embodiment.

FIG. 7 shows a photographing lens 100-3 according to a third embodiment, and the following table shows design data of the third embodiment.

In the third embodiment, the focal length of the first lens 10-3 is 3.2404 mm, the focal length of the second lens 20-3 is −4.2456 mm, the focal length of the third lens 30-3 is 12.8339 mm, the focal length of the fourth lens 40-3 is 2.0247 mm, and a focal length of the fifth lens 50-3 is −1.9258 mm. An aperture stop ST may be located at an image side surface of the first lens 10-3.

| Lens surface | Radius of curvature | Thickness | Refractive index (nd) | Abbe's number (vd) |
|---|---|---|---|---|
| S1 | infinity | 0.000 | | |
| S2(ST)* | −60.888 | 0.701 | 1.531 | 56.51 |
| S3* | −1.684 | 0.130 | | |
| S4* | 4.105 | 0.416 | 1.632 | 23.3 |
| S5* | 1.568 | 0.268 | | |
| S6* | 4.134 | 0.723 | 1.531 | 56.51 |
| S7* | 9.835 | 0.345 | | |
| S8* | −4.126 | 0.767 | 1.531 | 56.51 |
| S9* | −0.910 | 0.091 | | |
| S10* | 7.400 | 0.596 | 1.531 | 56.51 |
| S11* | 0.875 | 0.379 | | |
| S12 | infinity | 0.300 | 1.517 | 64.20 |
| S13 | infinity | 0.840 | | |
| img | infinity | 0.010 | | |

The following table shows a conic constant K, and deformation terms A, B, C, D, E, and F.

| Lens surface | K | A | B | C | D | E | F |
|---|---|---|---|---|---|---|---|
| S2 | 0.0000E+00 | −5.5933E−02 | −2.3605E−02 | 3.4705E−03 | −1.8004E−02 | | |
| S3 | 0.0000E+00 | −1.7410E−02 | −1.2926E−02 | −4.0911E−02 | 3.5769E−02 | | |
| S4 | 0.0000E+00 | −9.5488E−02 | 3.8869E−02 | −5.0329E−02 | −1.3510E−02 | | |
| S5 | 0.0000E+00 | −2.1280E−01 | 1.4835E−01 | −9.5895E−02 | −3.2732E−02 | | |
| S6 | 0.0000E+00 | −9.8640E−02 | 5.5897E−02 | 5.6651E−02 | −8.6393E−02 | | |
| S7 | 0.0000E+00 | −5.5907E−02 | −2.0992E−02 | 0.0000E+00 | 0.0000E+00 | | |
| S8 | 0.0000E+00 | −1.0341E−01 | 1.1409E−01 | −7.7735E−02 | 4.5531E−03 | | |
| S9 | −3.4120E+00 | −1.2268E−01 | 1.1008E−01 | −3.9229E−02 | 9.1334E−03 | −1.0241E−03 | |
| S10 | 0.0000E+00 | −2.4247E−02 | −2.9637E−03 | 3.8644E−03 | −3.9685E−04 | −6.1814E−05 | |
| S11 | −4.9874E+00 | −7.5804E−02 | 3.4728E−02 | −1.1776E−02 | 2.3755E−03 | −2.4491E−04 | 9.3841E−06 |

| Lens surface | K | A | B | C | D | E | F |
|---|---|---|---|---|---|---|---|
| S2 | 0.0000E+00 | −7.6166E−02 | −5.3568E−02 | 3.6654E−02 | −5.0448E−02 | | |
| S3 | 0.0000E+00 | 4.1291E−02 | −1.1383E−01 | 9.4700E−02 | −4.7148E−02 | | |
| S4 | 0.0000E+00 | −4.2799E−02 | −1.9920E−02 | 2.6938E−02 | −2.0766E−02 | | |
| S5 | 0.0000E+00 | −1.7022E−01 | 8.5667E−02 | −5.5660E−02 | 4.3484E−03 | | |
| S6 | 0.0000E+00 | −4.5791E−02 | 1.9374E−02 | 2.1140E−02 | −1.4921E−02 | | |
| S7 | 0.0000E+00 | −3.3414E−02 | −3.8239E−02 | 0.0000E+00 | 0.0000E+00 | | |
| S8 | 0.0000E+00 | 4.6627E−02 | 2.4536E−02 | −9.5940E−02 | 5.6186E−02 | −1.6881E−02 | |
| S9 | −3.8174E+00 | −4.6764E−02 | 7.1232E−02 | −3.1929E−02 | 8.0984E−03 | −8.2343E−04 | |
| S10 | 0.0000E+00 | −9.6331E−02 | 3.2101E−02 | −5.3965E−03 | 4.1544E−04 | | |
| S11 | −5.6080E+00 | −7.4646E−02 | 3.2094E−02 | −9.3263E−03 | 1.6581E−03 | −1.6502E−04 | 6.8216E−06 |

Figure 8:
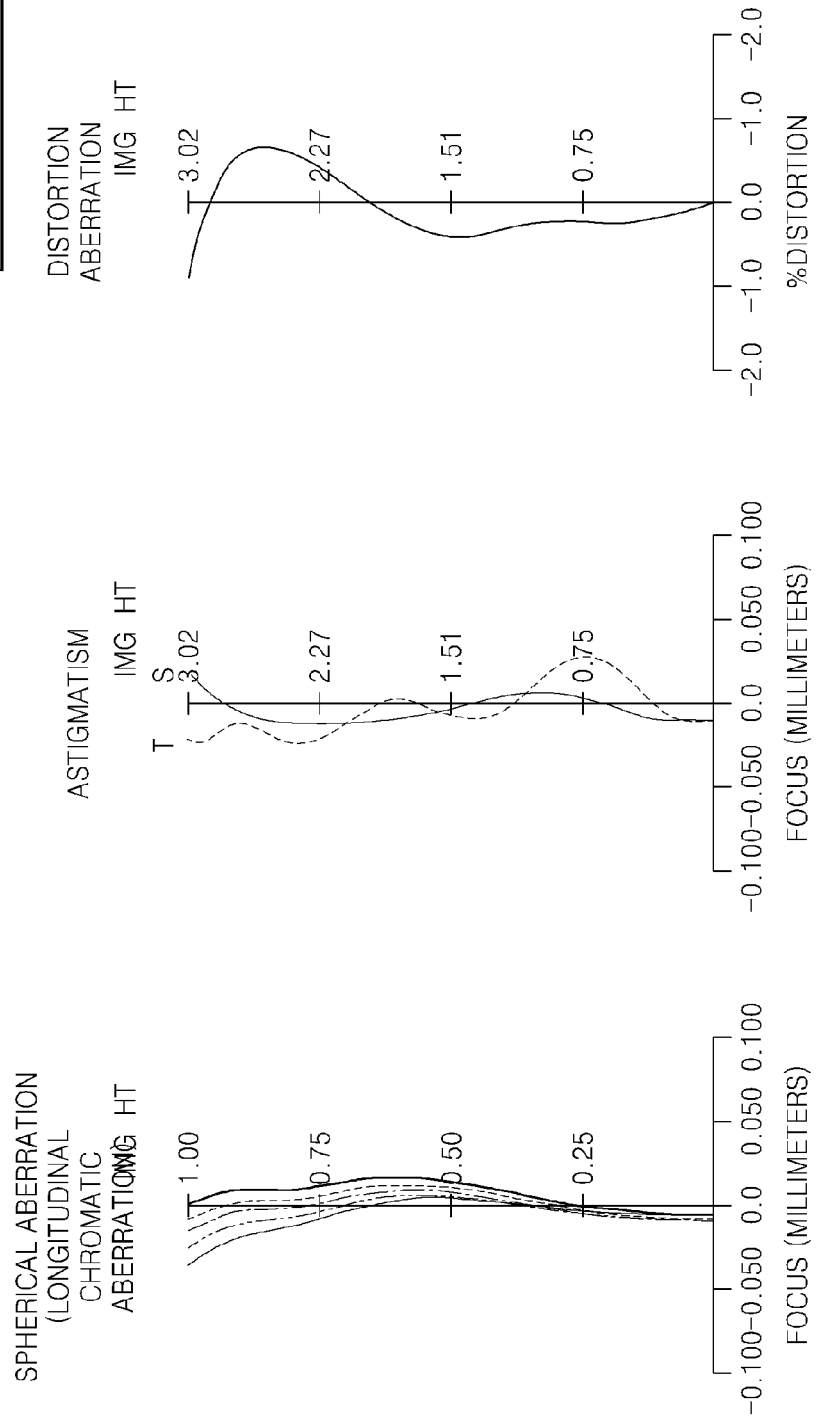
FIG. 8 is a diagram showing a longitudinal aberration of the photographing lens of FIG. 7.
Figure 9:
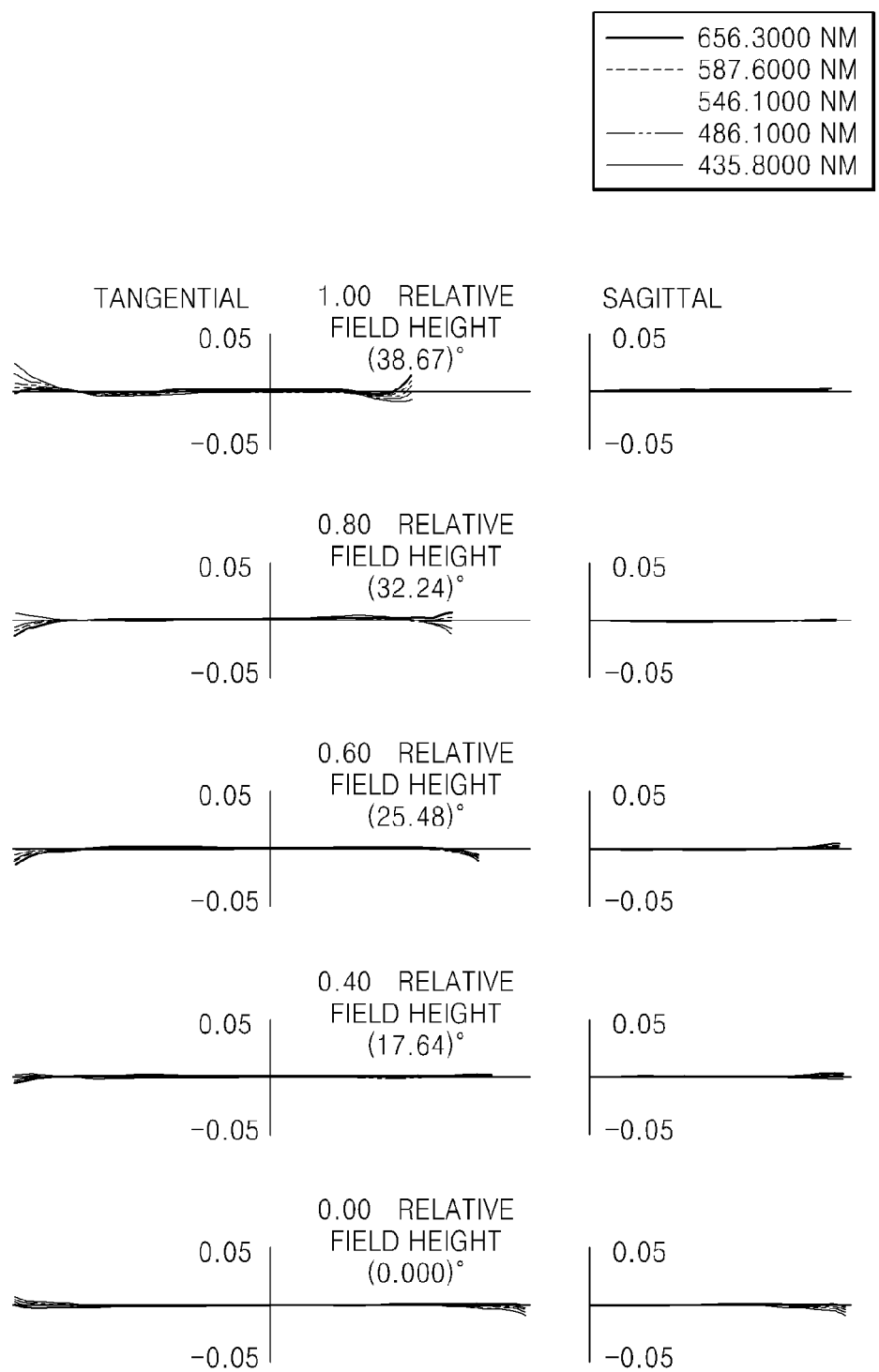
FIG. 9 is a diagram showing a coma aberration of the photographing lens of FIG. 7.

FIG. 8 shows the longitudinal spherical aberration, astigmatic field curvature, and distortion of the photographing lens 100-3 according to the third embodiment. Tangential field curvature (T) and sagittal field curvature (S) are shown as the astigmatic field curvature. FIG. 9 shows the coma aberration of the photographing lens according to the third embodiment.

Fourth Embodiment

Figure 10:
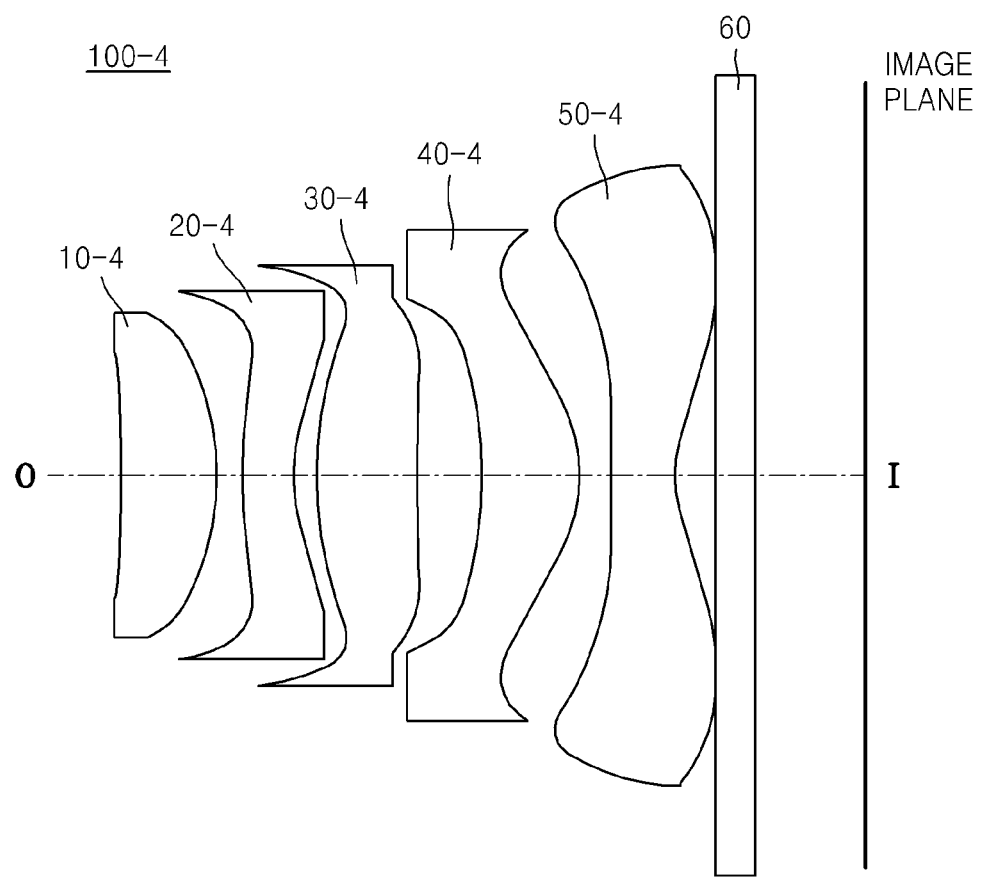
FIG. 10 is a diagram showing a photographing lens according to another embodiment.

FIG. 10 shows a photographing lens 100-4 according to a fourth embodiment, and the following table shows design data of the fourth embodiment. In the fourth embodiment, the focal length of the first lens 10-4 is 3.7357 mm, the focal length of the second lens 20-4 is −3.8447 mm, the focal length of the third lens 30-4 is 5.38 mm, the focal length of the fourth lens 40-4 is 2.4113 mm, and the focal length of the fifth lens 50-4 is −2.0672 mm. An aperture stop ST may be located on the image side surface of the first lens 10-4.

| Lens surface | Radius of curvature | Thickness | Refractive index (nd) | Abbe's number (vd) |
|---|---|---|---|---|
| S1 | infinity | 0.000 | | |
| S2* | −1000.000 | 0.729 | 1.531 | 56.51 |
| S3(ST)* | −1.985 | 0.208 | | |
| S4* | 5.236 | 0.400 | 1.632 | 23.3 |
| S5* | 1.622 | 0.174 | | |
| S6* | 2.741 | 0.786 | 1.531 | 56.51 |
| S7* | 57.409 | 0.485 | | |
| S8* | −3.330 | 0.752 | 1.531 | 56.51 |
| S9* | −0.999 | 0.249 | | |
| S10* | 20.583 | 0.500 | 1.531 | 56.51 |
| S11* | 1.036 | 0.316 | | |
| S12 | infinity | 0.300 | 1.517 | 64.20 |
| S13 | infinity | 0.847 | | |
| img | infinity | 0.000 | | |

The following table shows a conic constant K, and deformation terms A, B, C, D, E, and F.

Figure 11:
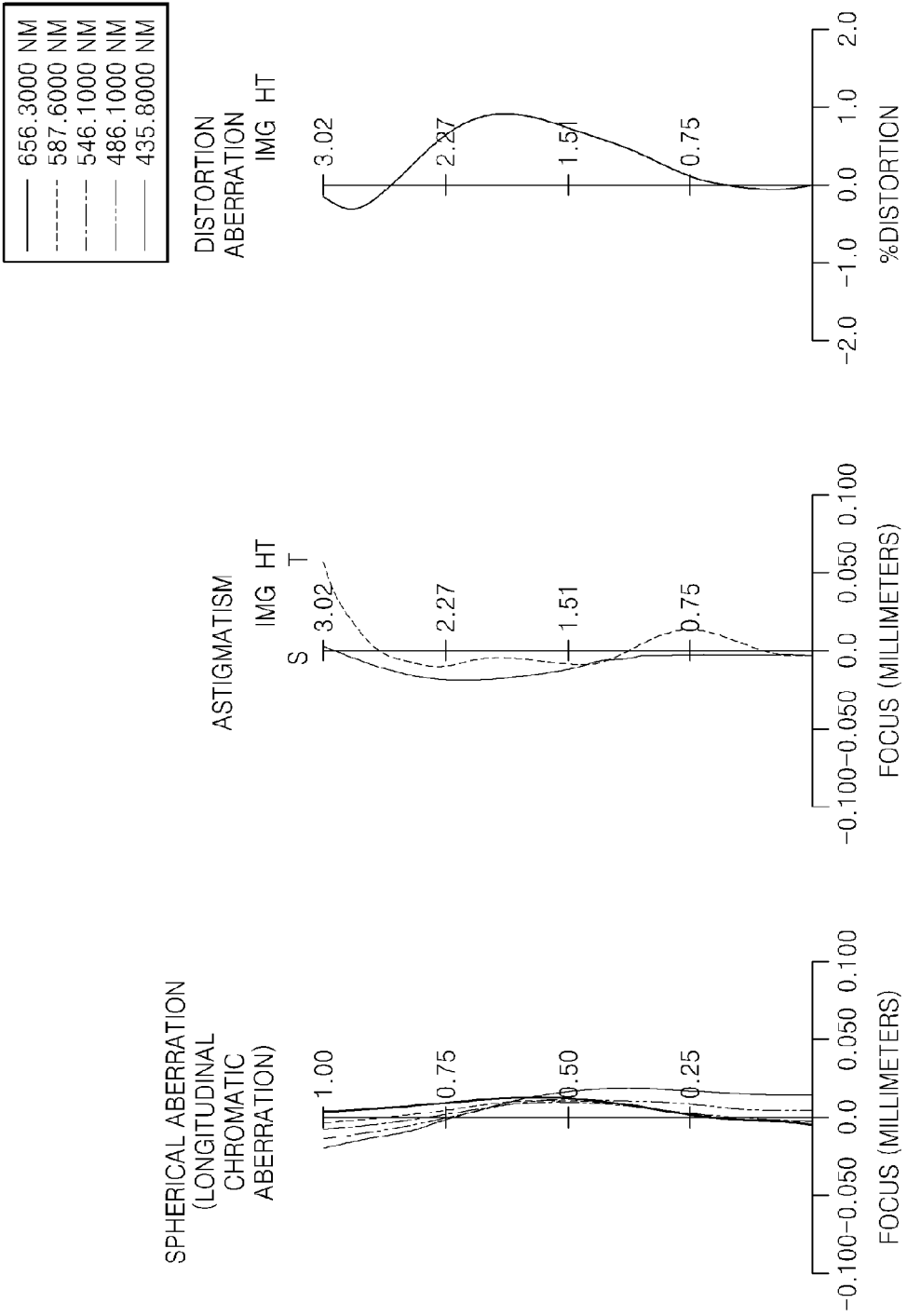
FIG. 11 is a diagram showing a longitudinal aberration of the photographing lens of FIG. 10.
Figure 12:
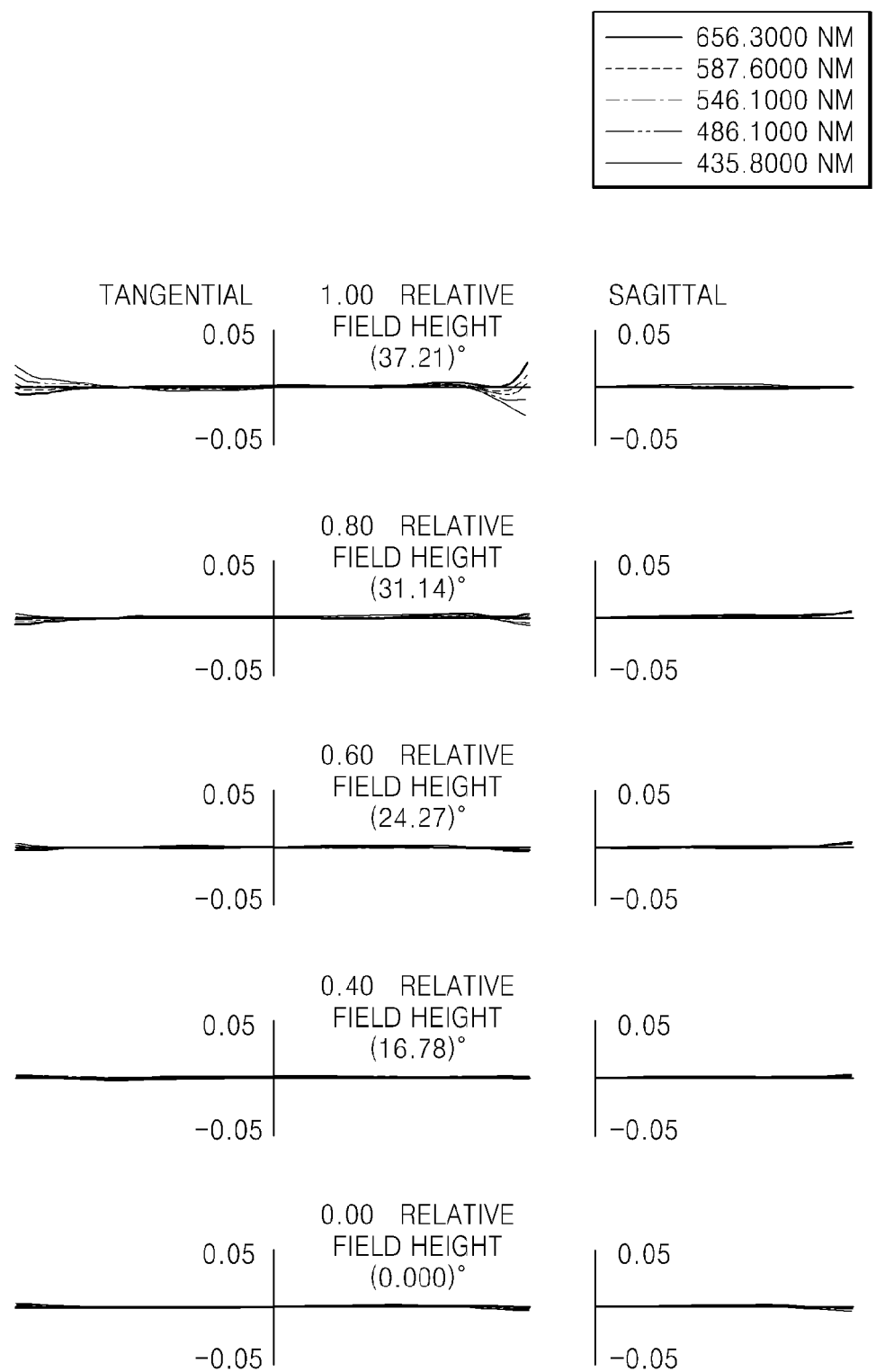
FIG. 12 is a diagram showing a coma aberration of the photographing lens of FIG. 10.

FIG. 11 shows the longitudinal spherical aberration, astigmatic field curvature, and distortion of the photographing lens 100-4 according to the fourth embodiment. Tangential field curvature (T) and sagittal field curvature (S) are shown as the astigmatic field curvature. FIG. 12 shows the coma aberration of the photographing lens according to the fourth embodiment.

Fifth Embodiment

Figure 13:
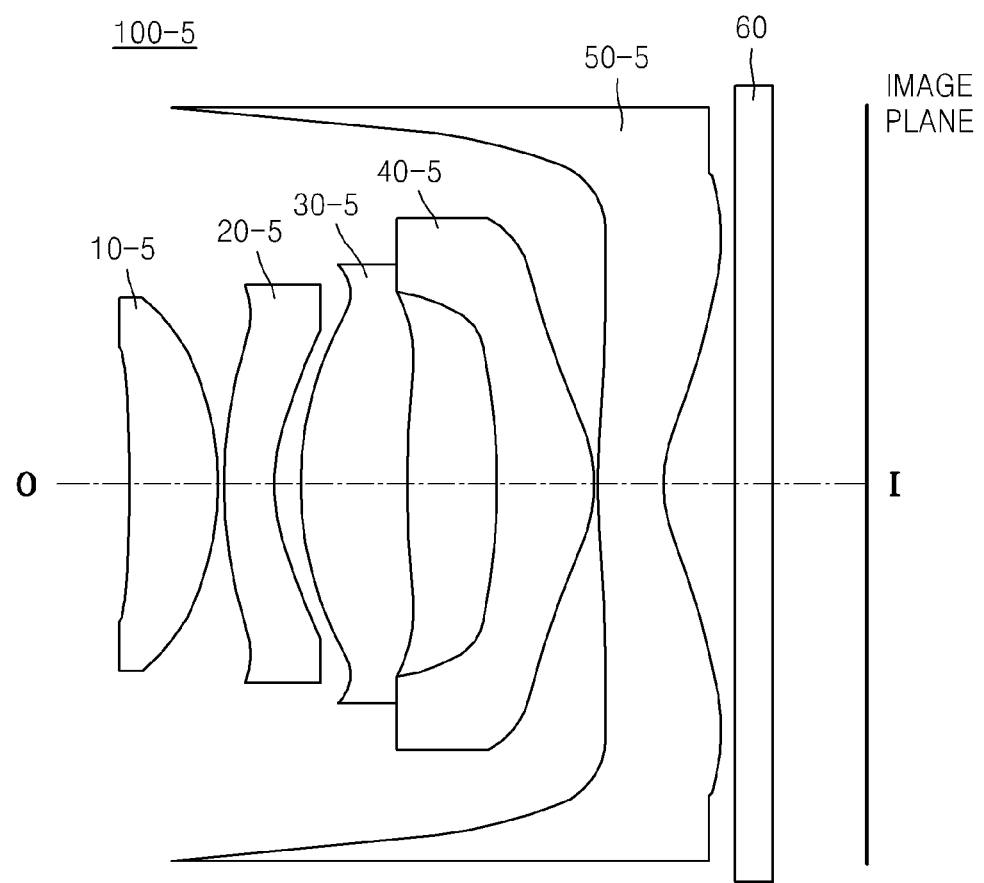
FIG. 13 is a diagram showing a photographing lens according to another embodiment.

FIG. 13 shows a photographing lens 100-5 according to a fifth embodiment, and the following table shows design data of the fifth embodiment. In the fifth embodiment, the focal length of the first lens 10-5 is 4.6212 mm, the focal length of the second lens 20-5 is −5.6079 mm, the focal length of the third lens 30-5 is 6.9636 mm, the focal length of the fourth lens 40-5 is 2.0551 mm, and the focal length of the fifth lens 50-5 is −1.9017 mm. An aperture stop ST may be located on the object side surface of the first lens 10-5.

| Lens surface | Radius of curvature | Thickness | Refractive index (nd) | Abbe's number (vd) |
|---|---|---|---|---|
| S1 | infinity | 0.000 | | |
| S2(ST)* | −2000.0 | 0.678 | 1.544 | 56.09 |
| S3* | −2.522 | 0.040 | | |
| S4* | 2.867 | 0.400 | 1.651 | 21.53 |
| S5* | 1.524 | 0.203 | | |
| S6* | 2.533 | 0.830 | 1.544 | 56.09 |
| S7* | 6.701 | 0.681 | | |
| S8* | −5.754 | 0.751 | 1.544 | 56.09 |
| S9* | −0.983 | 0.041 | | |
| S10* | 4.978 | 0.500 | 1.544 | 56.09 |
| S11* | 0.829 | 0.426 | | |
| S12 | infinity | 0.300 | 1.517 | 64.20 |
| S13 | infinity | 0.840 | | |
| img | infinity | 0.010 | | |

The following table shows a conic constant K, and deformation terms A, B, C, D, E, and F.

| Lens surface | K | A | B | C | D | E | F |
|---|---|---|---|---|---|---|---|
| S2 | 0.0000E+00 | −4.8048E−02 | −1.0367E−02 | 6.7176E−04 | −3.9965E−03 | | |
| S3 | 0.0000E+00 | 7.7710E−02 | −1.1604E−01 | 9.9346E−02 | −4.4637E−02 | | |
| S4 | 0.0000E+00 | −3.8916E−03 | −2.5531E−02 | 2.4601E−02 | −2.6744E−02 | | |
| S5 | 0.0000E+00 | −1.7769E−01 | 1.1363E−01 | −6.7216E−02 | 8.1960E−04 | | |
| S6 | 0.0000E+00 | −5.3826E−02 | 1.9384E−02 | 2.1282E−02 | −1.6061E−02 | | |
| S7 | 0.0000E+00 | −2.9277E−03 | −3.1692E−02 | 0.0000E+00 | 0.0000E+00 | | |
| S8 | 0.0000E+00 | 1.6411E−02 | 4.3711E−02 | −9.8955E−02 | 6.6148E−02 | −2.2249E−02 | |
| S9 | −3.6247E+00 | −6.4624E−02 | 6.5510E−02 | −3.0330E−02 | 8.4499E−03 | −8.1306E−04 | |
| S10 | 0.0000E+00 | −9.6601E−02 | 2.8802E−02 | −6.5913E−03 | 8.4545E−04 | | |
| S11 | −5.7332E+00 | −7.1532E−02 | 2.7900E−02 | −8.5589E−03 | 1.6037E−03 | −1.7412E−04 | 8.3609E−06 |

| Lens surface | K | A | B | C | D | E | F |
|---|---|---|---|---|---|---|---|
| S2 | 0.0000E+00 | −6.4499E−02 | −9.3821E−04 | −4.2203E−03 | −4.2463E−04 | | |
| S3 | 0.0000E+00 | −1.0335E−02 | −9.5764E−03 | 0.0000E+00 | 0.0000E+00 | | |
| S4 | 0.0000E+00 | −2.5198E−02 | −3.7425E−03 | 3.5455E−03 | −2.7334E−03 | | |
| S5 | 0.0000E+00 | −8.4020E−02 | −1.4339E−02 | 7.0059E−03 | −7.2815E−03 | | |
| S6 | 0.0000E+00 | 3.8150E−03 | −1.6258E−02 | 1.1113E−02 | −3.9473E−03 | | |
| S7 | 0.0000E+00 | −1.7439E−02 | −1.5577E−02 | 0.0000E+00 | 0.0000E+00 | | |
| S8 | 0.0000E+00 | 2.2402E−02 | 5.7969E−03 | −4.3128E−03 | 2.8025E−02 | −1.0223E−02 | |
| S9 | −5.7658E+00 | −3.2961E−02 | 5.4978E−02 | −2.6799E−02 | 6.2984E−03 | −6.2531E−04 | |
| S10 | 0.0000E+00 | −8.8498E−02 | 2.8903E−02 | −3.5710E−03 | 1.3307E−04 | −8.3141E−06 | |
| S11 | −5.4602E+00 | −6.3348E−02 | 2.6823E−02 | −8.4636E−03 | 1.6536E−03 | −1.6991E−04 | 6.7061E−06 |

Figure 14:
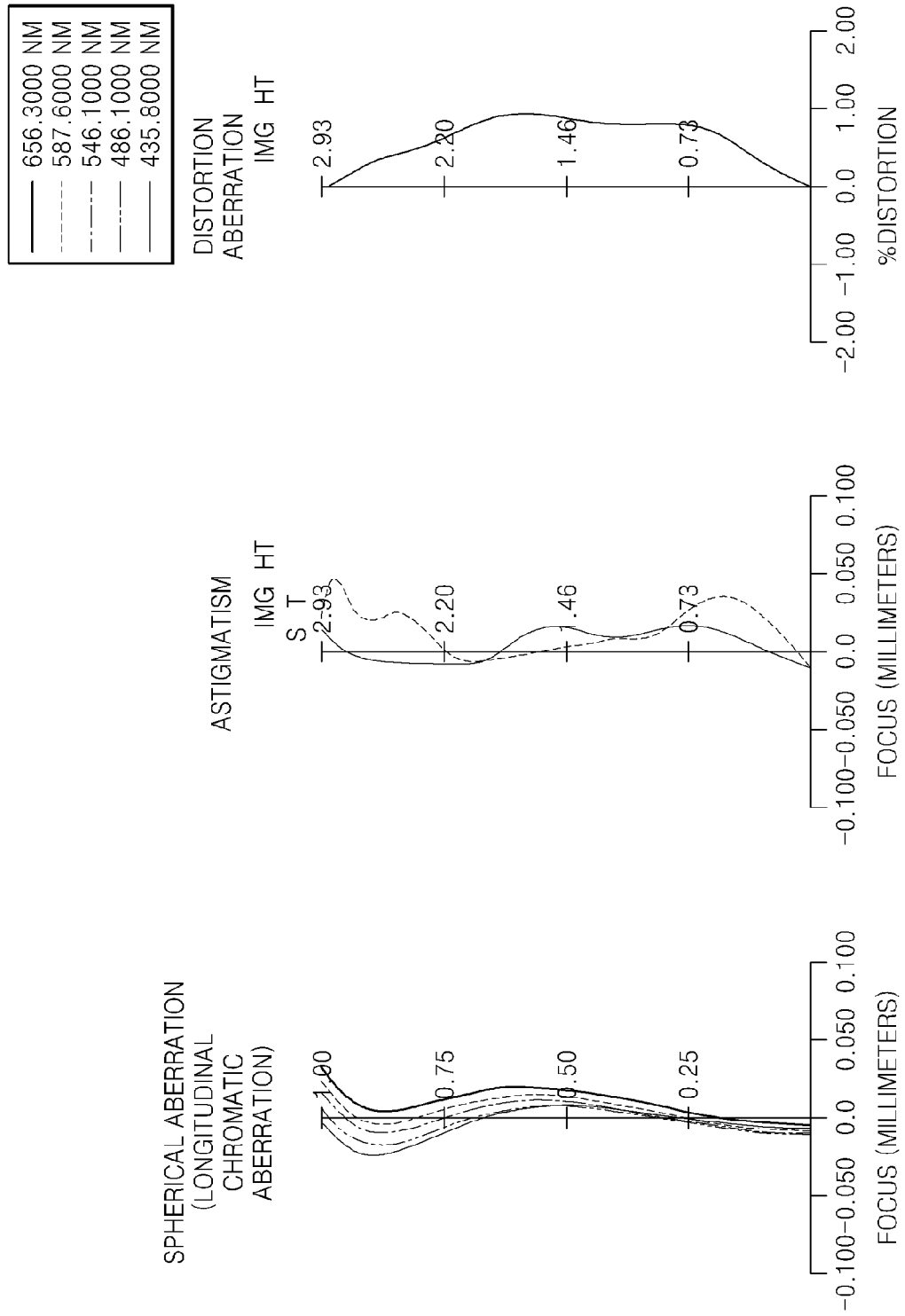
FIG. 14 is a diagram showing a longitudinal aberration of the photographing lens of FIG. 13.
Figure 15:
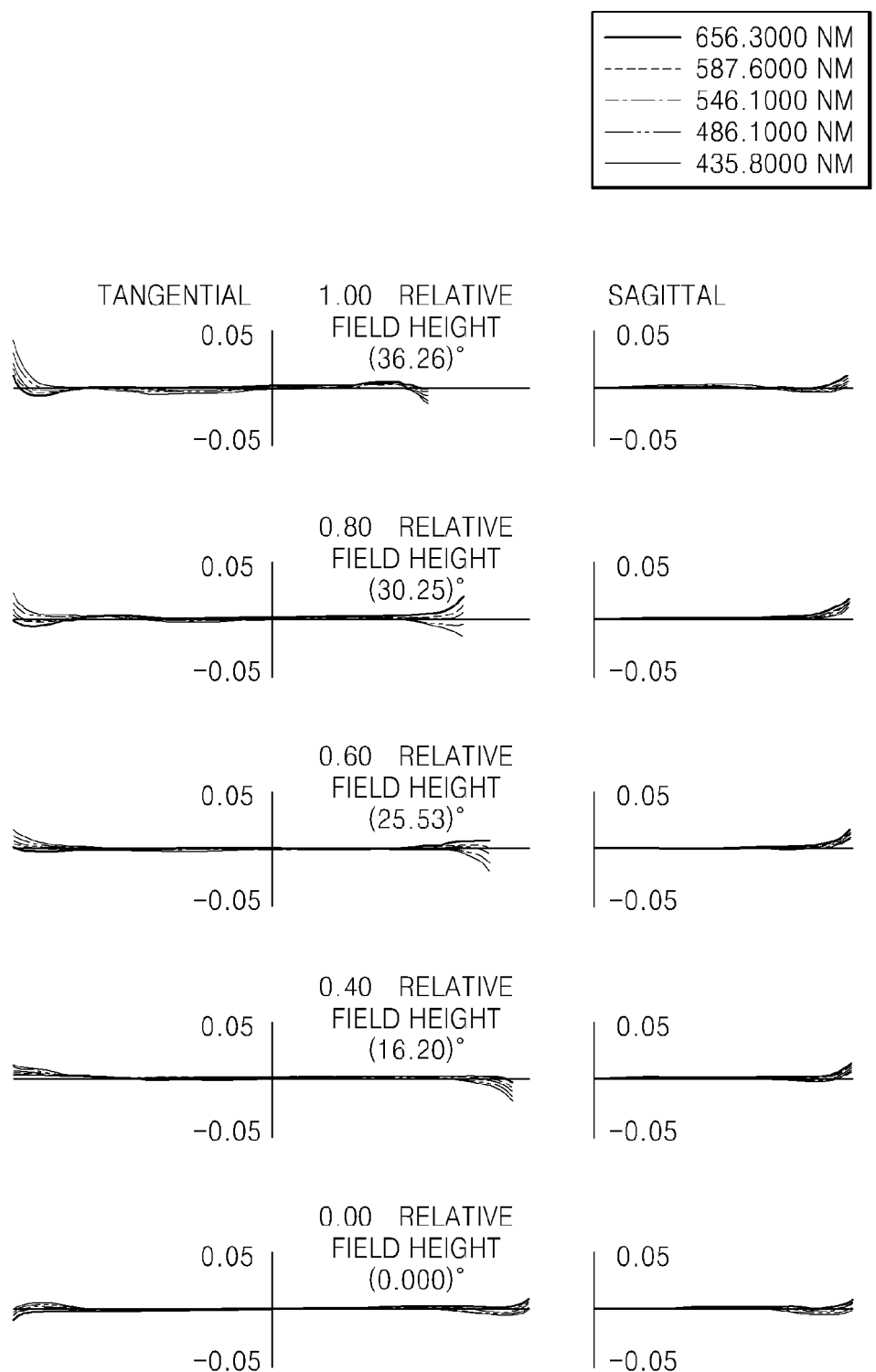
FIG. 15 is a diagram showing a coma aberration of the photographing lens of FIG. 13.

FIG. 14 shows the longitudinal spherical aberration, astigmatic field curvature, and distortion of the photographing lens 100-5 according to the fifth embodiment. Tangential field curvature (T) and sagittal field curvature (S) are shown as the astigmatic field curvature. FIG. 15 shows the coma aberration of the photographing lens according to the fifth embodiment.

Sixth Embodiment

Figure 16:
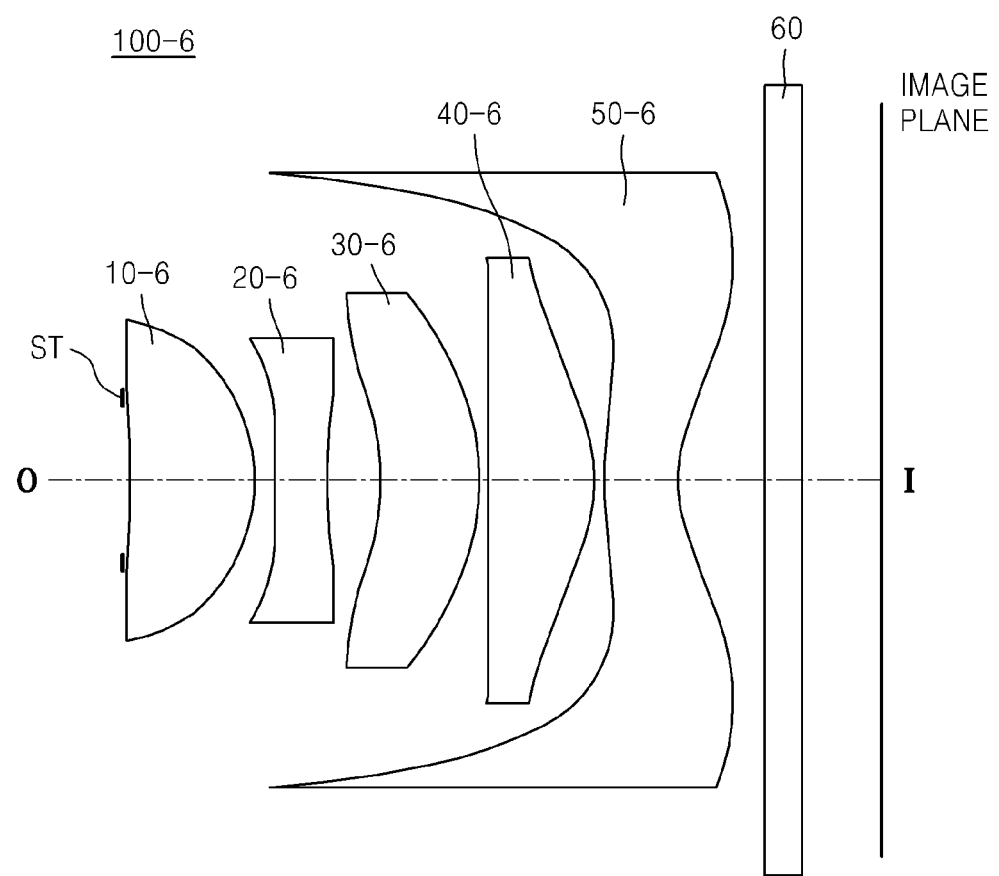
FIG. 16 is a diagram showing a photographing lens according to another embodiment.

FIG. 16 shows a photographing lens 100-6 according to a sixth embodiment, and the following table shows design data of the sixth embodiment. In the sixth embodiment, the focal length of the first lens 10-6 is 2.8379 mm, the focal length of the second lens 20-6 is −5.8123 mm, the focal length of the third lens 30-6 is −5821.1188 mm, the focal length of the fourth lens 40-6 is 2.4879 mm, and the focal length of the fifth lens 50-6 is −2.6379 mm. An aperture stop ST may be located on the object side surface of the first lens 10-6.

| Lens surface | Radius of curvature | Thickness | Refractive index (nd) | Abbe's number (vd) |
|---|---|---|---|---|
| S1 | infinity | 0.000 | | |
| S2(ST)* | −13.678 | 1.010 | 1.531 | 56.51 |
| S3* | −1.393 | 0.174 | | |
| S4* | 64.869 | 0.420 | 1.632 | 23.3 |
| S5* | 3.472 | 0.437 | | |
| S6* | −1.833 | 0.800 | 1.531 | 56.51 |
| S7* | −2.112 | 0.080 | | |
| S8* | −16.377 | 0.850 | 1.531 | 56.51 |
| S9* | −1.245 | 0.080 | | |
| S10* | 3.752 | 0.600 | 1.583 | 29.78 |
| S11* | 1.027 | 0.455 | | |
| S12 | infinity | 0.300 | 1.517 | 64.20 |
| S13 | infinity | 0.885 | | |
| img | infinity | 0.020 | | |

The following table shows a conic constant K, and deformation terms A, B, C, D, E, and F.

Figure 17:
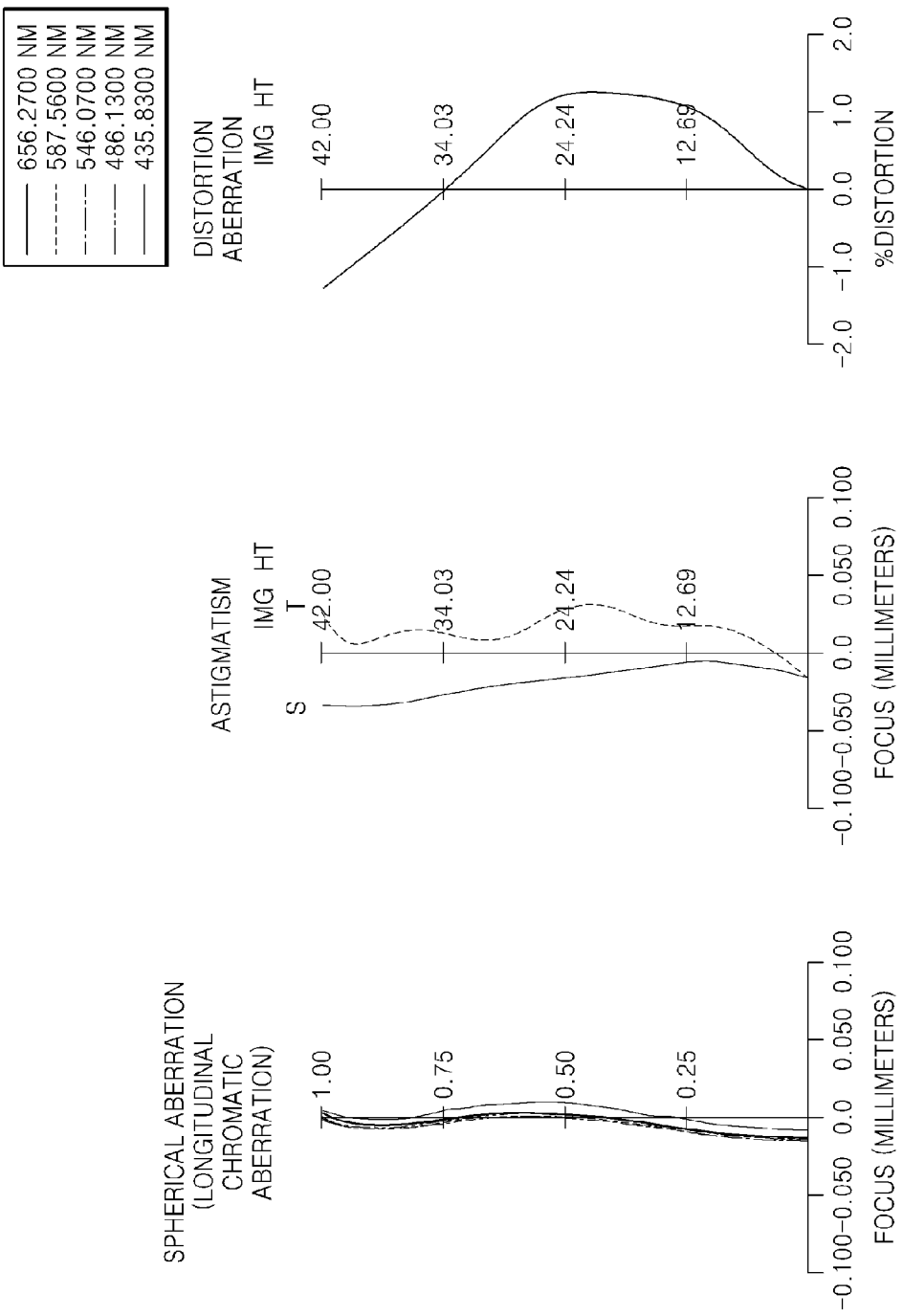
FIG. 17 is a diagram showing a longitudinal aberration of the photographing lens of FIG. 16.
Figure 18:
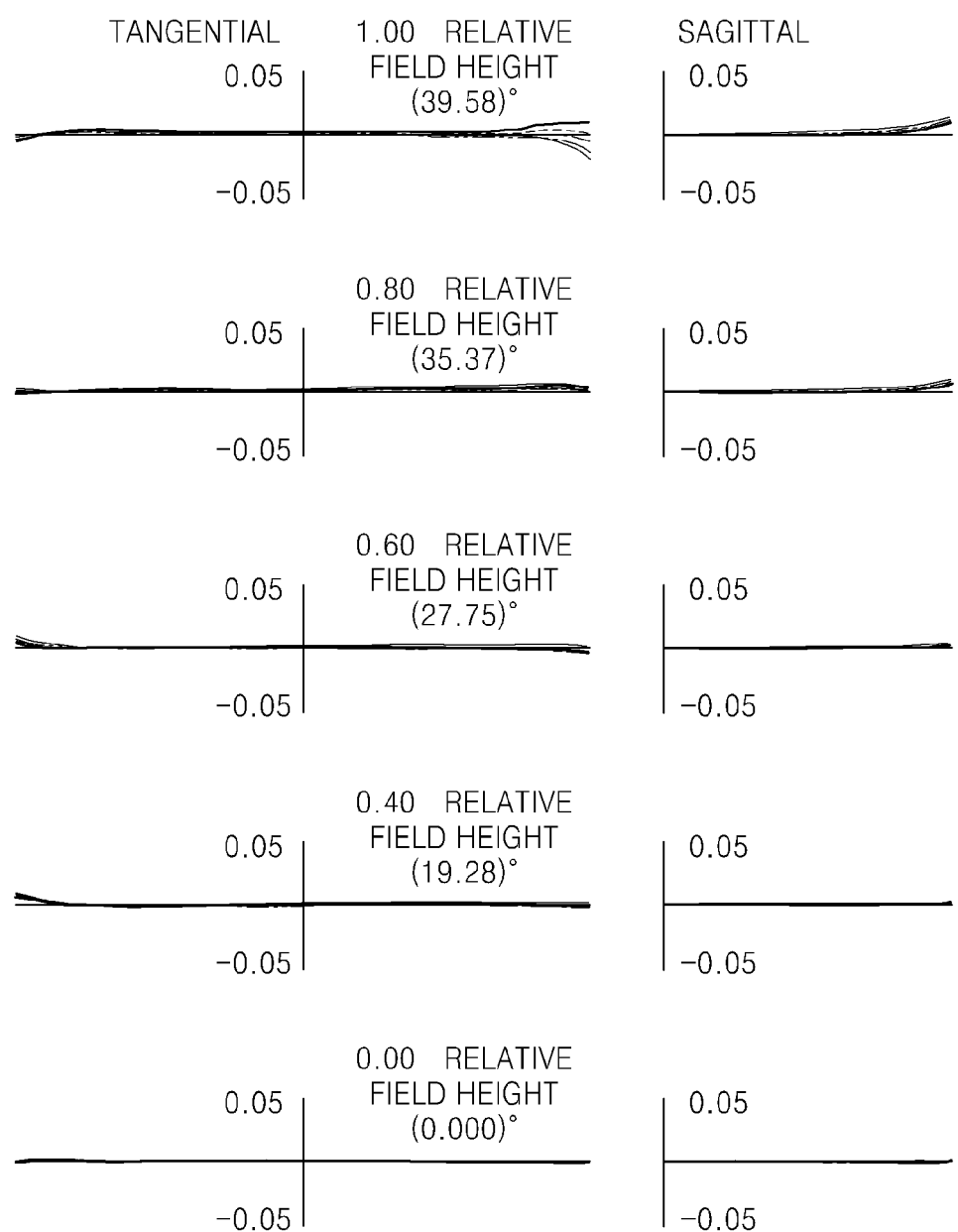
FIG. 18 is a diagram showing a coma aberration of the photographing lens of FIG. 16.

FIG. 17 shows the longitudinal spherical aberration, astigmatic field curvature, and distortion of the photographing lens 100-6 according to the sixth embodiment. Tangential field curvature (T) and sagittal field curvature (S) are shown as the astigmatic field curvature. FIG. 18 shows the coma aberration of the photographing lens according to the sixth embodiment.

Seventh Embodiment

Figure 19:
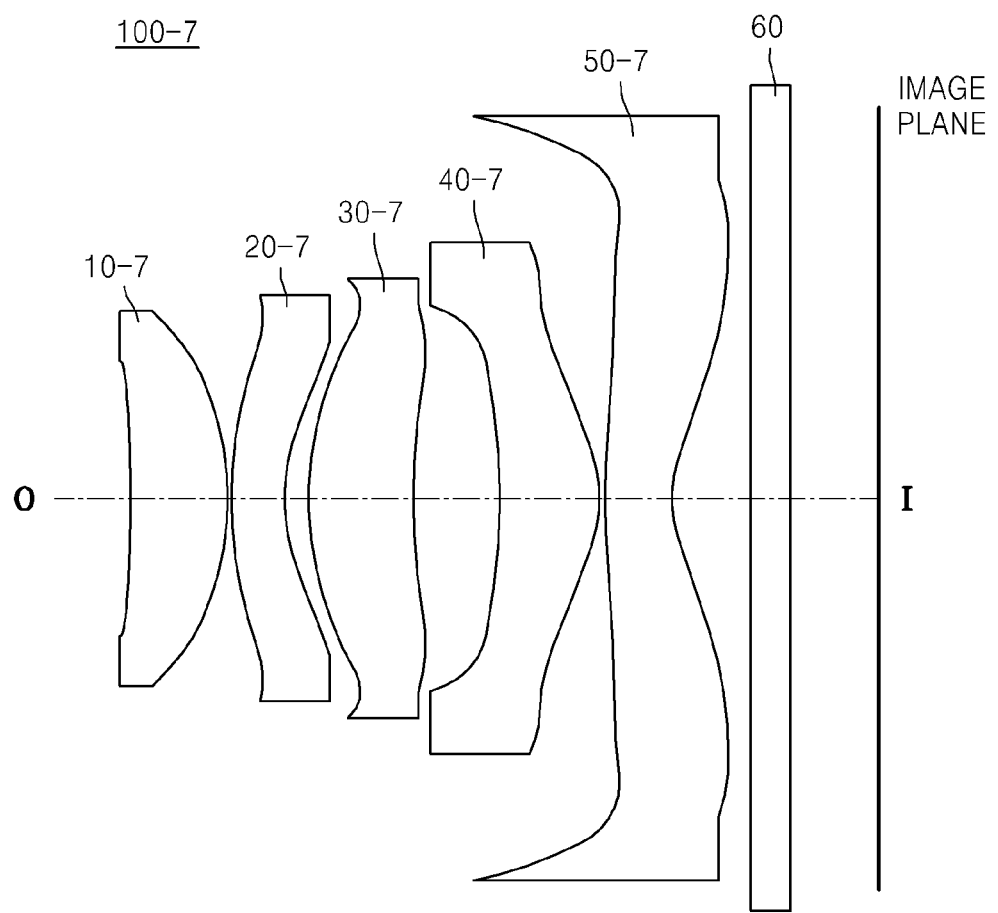
FIG. 19 is a diagram showing a photographing lens according to another embodiment.
Figure 20:
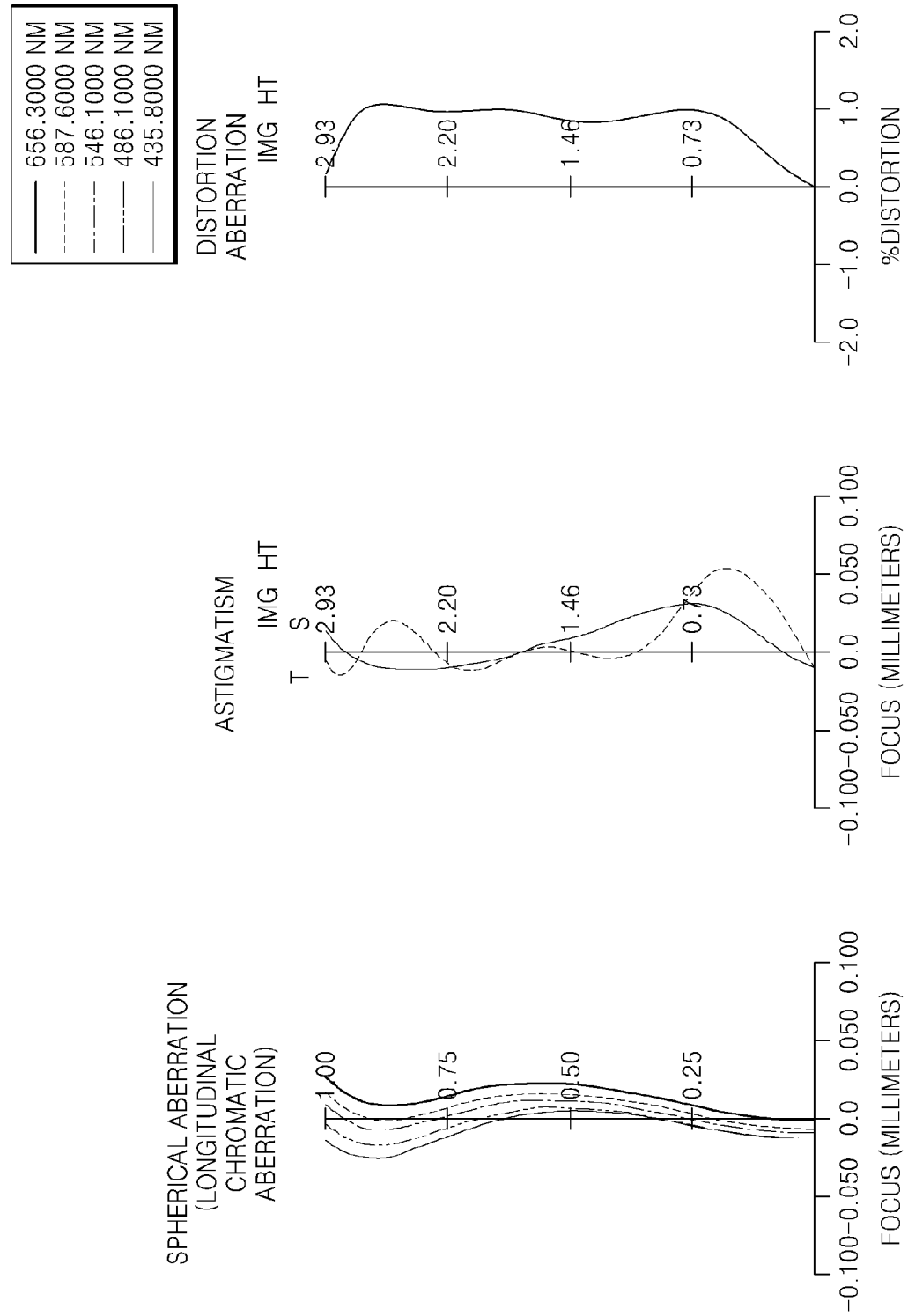
FIG. 20 a diagram showing a longitudinal aberration of the photographing lens of FIG. 19.
Figure 21:
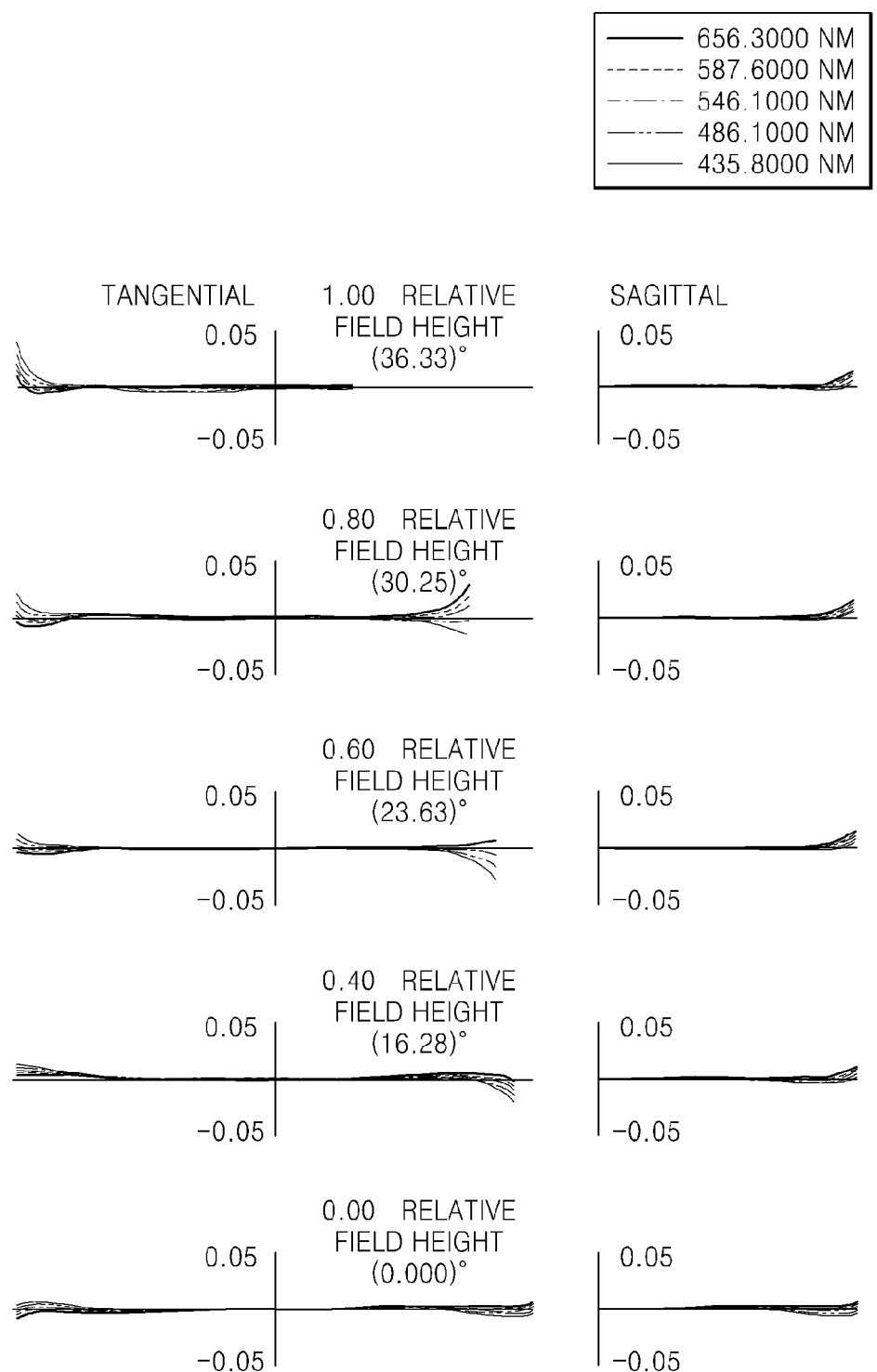
FIG. 21 is a diagram showing a coma aberration of the photographing lens of FIG. 19.

FIG. 19 shows a photographing lens 100-7 according to a seventh embodiment, and the following table shows design data of the seventh embodiment. In the seventh embodiment, the focal length of the first lens 10-7 is 4.6028 mm, the focal length of the second lens 20-7 is −5.9615 mm, the focal length of the third lens 30-7 is −7.7884 mm, the focal length of the fourth lens 40-7 is 2.1126 mm, and the focal length of the fifth lens 50-7 is −2.0034 mm. An aperture stop ST may be located on the object side surface of the first lens 10-7.

| Lens surface | Radius of curvature | Thickness | Refractive index (nd) | Abbe's number (vd) |
|---|---|---|---|---|
| S1 | infinity | 0.000 | | |
| S2(ST)* | −2500.000 | 0.736 | 1.544 | 56.09 |
| S3* | −2.513 | 0.040 | | |
| S4* | 2.810 | 0.400 | 1.651 | 21.53 |
| S5* | 1.544 | 0.187 | | |
| S6* | 2.446 | 0.801 | 1.544 | 56.09 |
| S7* | 5.089 | 0.645 | | |
| S8* | −4.282 | 0.757 | 1.544 | 56.09 |
| S9* | −0.966 | 0.059 | | |
| S10* | 4.007 | 0.500 | 1.544 | 56.09 |
| S11* | 0.822 | 0.426 | | |
| S12 | infinity | 0.300 | 1.517 | 64.20 |
| S13 | infinity | 0.840 | | |
| img | infinity | 0.010 | | |

The following table shows a conic constant K, and deformation terms A, B, C, D, E, and F.

| Lens surface | K | A | B | C | D | E | F |
|---|---|---|---|---|---|---|---|
| S2 | 0.0000E+00 | −6.7978E−02 | −3.2804E−02 | 1.0050E−02 | −3.0573E−02 | −5.1158E−02 | |
| S3 | 0.0000E+00 | −3.6157E−03 | −1.2099E−02 | 7.3756E−02 | −5.0973E−02 | | |
| S4 | 0.0000E+00 | −1.6294E−01 | 3.3588E−02 | 2.4544E−02 | −2.0507E−02 | | |
| S5 | 0.0000E+00 | −1.3742E−01 | 5.1578E−02 | −1.0648E−02 | −5.4254E−06 | | |
| S6 | 0.0000E+00 | 5.7240E−02 | 5.3561E−02 | −2.2879E−02 | 3.2595E−03 | | |
| S7 | 0.0000E+00 | −8.2418E−03 | 8.4624E−03 | 6.0369E−04 | −4.5122E−04 | | |
| S8 | 0.0000E+00 | 2.6945E−02 | −3.7827E−03 | −1.3940E−03 | 2.0280E−04 | | |
| S9 | −4.9498E+00 | 4.2686E−03 | 7.4616E−03 | −2.4629E−03 | −1.3531E−04 | 1.1389E−04 | |
| S10 | 0.0000E+00 | −6.3698E−02 | −7.4412E−03 | 3.7294E−03 | −5.5161E−04 | | |
| S11 | −4.2826E+00 | −3.7388E−02 | 4.1846E−03 | −3.3903E−04 | 7.2894E−05 | −1.5714E−05 | 1.0847E−06 |

| Lens surface | K | A | B | C | D | E | F |
|---|---|---|---|---|---|---|---|
| S2 | 0.0000E+00 | −5.9390E−02 | −3.2894E−03 | −5.7245E−03 | 2.9888E−04 | | |
| S3 | 0.0000E+00 | −1.5994E−02 | −7.5062E−03 | 0.0000E+00 | 0.0000E+00 | | |
| S4 | 0.0000E+00 | −3.0586E−02 | −2.7023E−03 | 3.9594E−03 | −2.2081E−03 | | |
| S5 | 0.0000E+00 | −8.0308E−02 | −1.5157E−02 | 7.1354E−03 | −7.4399E−03 | | |
| S6 | 0.0000E+00 | 1.9525E−03 | −1.4559E−02 | 1.1328E−02 | −4.5401E−03 | | |
| S7 | 0.0000E+00 | −1.2034E−02 | −1.2424E−02 | 0.0000E+00 | 0.0000E+00 | | |
| S8 | 0.0000E+00 | 4.2205E−02 | 6.9982E−03 | −4.4999E−02 | 2.8235E−02 | −9.0730E−03 | |
| S9 | −5.5298E+00 | −3.5237E−02 | 5.7770E−02 | −2.6130E−02 | 6.2679E−03 | −6.6199E−04 | |
| S10 | 0.0000E+00 | −9.3297E−02 | 2.8431E−02 | −3.5119E−03 | 1.2193E−04 | −4.0383E−07 | |
| S11 | −5.3780E+00 | −6.5603E−02 | 2.7662E−02 | −8.5024E−03 | 1.6226E−03 | −1.6506E−04 | 6.5402E−06 |

Lens data of the first through seventh embodiments are shown in the following table.

| | Embodiment 1 | Embodiment 2 | Embodiment 3 | Embodiment 4 | Embodiment 5 | Embodiment 6 | Embodiment 7 |
|---|---|---|---|---|---|---|---|
| F-number | F/2.44 | F/2.68 | F/2.35 | F/2.68 | F/1.88 | F/2.88 | F/1.9 |
| Half-angle of view (ω) | 39.58° | 40.0° | 38.66° | 37.21° | 36.26° | 42.0° | 36.34 |
| Total length (TL) | 5.46 mm | 5.60 mm | 5.56 mm | 5.75 mm | 5.70 mm | 6.11 mm | 5.70 mm |
| Entire focal length (f) | 3.70 mm | 3.60 mm | 3.80 mm | 3.98 mm | 3.99 mm | 3.40 mm | 3.97 mm |
| First lens local distance (f1) | 3.1867 mm | 4.1124 mm | 3.2404 mm | 3.7357 mm | 4.6212 mm | 2.8379 mm | 4.6028 mm |
| Second lens focal length (f2) | −4.1055 mm | −4.2148 mm | −4.2456 mm | −3.8447 mm | −5.6079 mm | −5.8123 mm | −5.9615 mm |
| Third lens focal length (f3) | 12.1540 mm | 6.3050 mm | 12.8339 mm | 5.3802 mm | 6.9636 mm | −5821.1188 mm | 7.7884 mm |
| Fourth lens focal length (f4) | 1.9891 mm | 1.5879 mm | 2.0247 mm | 2.4113 mm | 2.0551 mm | 2.4879 mm | 2.1126 mm |
| Fifth lens focal length (f5) | −1.9200 mm | −1.5593 mm | −1.9258 mm | −2.0672 mm | −1.9017 mm | −2.6379 mm | −2.0034 mm |
| f/f1 | 1.1611 | 0.8754 | 1.1727 | 1.0654 | 0.8634 | 1.1981 | 0.8625 |
| TL/f | 1.4754 | 1.5555 | 1.4632 | 1.4447 | 1.4286 | 1.7971 | 1.4358 |

The following table shows that the first through seventh embodiments satisfy the above inequalities 1 through 11.

| | Embodiment 1 | Embodiment 2 | Embodiment 3 | Embodiment 4 | Embodiment 5 | Embodiment 6 | Embodiment 7 |
|---|---|---|---|---|---|---|---|
| inequality 1 | 14.53 | 33.51 | 18.79 | 267.69 | 432.79 | 4.82 | 629.83 |
| inequality 2 | 28.15 | 63.86 | 36.16 | 503.78 | 793.02 | 9.82 | 994.95 |
| inequality 3 | 0.415 | 0.475 | 0.413 | 0.408 | 0.382 | 1.021 | 0.389 |
| inequality 4 | 56.51 | 56.51 | 56.51 | 56.51 | 56.09 | 56.51 | 56.09 |
| inequality 5 | 21.53 | 23.30 | 23.30 | 23.30 | 21.53 | 23.30 | 21.53 |
| inequality 6 | 56.51 | 56.51 | 56.51 | 56.51 | 56.51 | 56.09 | 56.09 |
| inequality 7 | 1.16 | 0.875 | 1.17 | 1.07 | 0.86 | 1.198 | 0.86 |
| inequality 8 | 1.48 | 1.56 | 1.46 | 1.45 | 1.43 | 1.80 | 1.44 |
| inequality 9 | 1.531 | 1.531 | 1.531 | 1.531 | 1.544 | 1.531 | 1.544 |
| inequality 10 | 1.651 | 1.632 | 1.632 | 1.632 | 1.651 | 1.632 | 1.651 |
| inequality 11 | 1.531 | 1.531 | 1.531 | 1.531 | 1.544 | 1.531 | 1.544 |

According to the embodiments, a photographing lens that is small, bright, and has a wide angle may be realized. The photographing lens may be applied to various photographing apparatuses such as digital cameras, single lens reflex cameras, video cameras, mobile phone cameras, and cameras for small-sized mobile devices.

While various embodiments have been shown and described, it will be understood by those of ordinary skill in the art that various changes in form and details may be made therein without departing from the spirit and scope of the present invention as defined by the following claims.

What is claimed is:
1. A photographing lens, wherein:
the photographing lens is a camera lens, and comprises:
exactly five lenses, consisting of a first lens, a second lens, a third lens, a fourth lens, and a fifth lens that are arranged sequentially from an object side to an image side,
wherein the first lens has a concave surface toward the object side and has a positive refractive power, the sec ond lens is formed with a meniscus shape having a concave surface toward the image side and has a negative refractive power, the third lens has a negative refractive power, the fourth lens has a positive refractive power, and the fifth lens has a negative refractive power, and wherein the first lens satisfies the inequality;

$7.0<|R1/R2|<1200$, where R1 denotes the radius of curvature of the object side surface of the first lens around the optical axsi, and R2 denotes the radius of curvature of the image side surface of the first lens around the optical axis.

2. The photographing lens of claim 1, wherein the first lens satisfies the inequality:

$3.0<|R1/f|<800$, where R1 denotes the radius of curvature of the object side surface of the first lens around an optical axis, and f denotes the focal length of the photographing lens.

3. The photographing lens of claim 1, wherein the second lens satisfies the inequality:

$0.25<R4/f<1.3$, where R4 denotes the radius of curvature of the image side surface of the second lens around the optical axis, and f denotes the focal length of the photographing lens.

4. The photographing lens of claim 1, wherein the fourth lens is a meniscus lens having a convex surface toward the image side.

5. The photographing lens of claim 1, wherein the fifth lens has at least one aspherical surface and has an image side surface that is concave around the optical axis.

6. The photographing lens of claim 1, wherein the photographing lens satisfies the inequality:

$vd1>50$, where vd1 denotes an Abbe's number of the first lens with respect to a d-line.

7. A photographing lens, wherein:

the photographing lens is a camera lens having an optical axis, and comprises exactly five lenses, consisting of a first lens, a second lens, a third lens, a fourth lens, and a fifth lens that are arranged sequentially from an object side to an image side, the first lens has a concave surface toward the object side around the optical axis and has a positive refractive power, the second lens is formed with a meniscus shape having a concave surface toward the image side and has a negative refractive power, and the photographing lens satisfies the inequalities:

$20<vd2<30$ and $vd4>50$, where vd2 denotes an Abbe's number of the second lens with respect to the d-line, and vd4 denotes an Abbe's number of the fourth lens with respect to the d-line.

8. The photographing lens of claim 1, wherein the photographing lens satisfies the inequality:

$0.7<f/f1<1.5$, where f denotes the focal length of the photographing lens, and f1 denotes the focal length of the first lens.

9. The photographing lens of claim 1, wherein the photographing lens satisfies the inequality:

$0.9<TL/f<2.0$, where f denotes the focal length of the photographing lens and TL denotes the distance from the object side surface of the first lens to an image plane.

10. The photographing lens of claim 1, wherein the photographing lens satisfies the inequality:

$1.51<N1<1.56$, where N1 denotes the refractive index of the first lens with respect to the d-line.

11. The photographing lens of claim 1, wherein the photographing lens satisfies the inequality:

$1.58<N2<1.66$, where N2 denotes the refractive index of the second lens with respect to the d-line.

12. The photographing lens of claim 1, wherein the photographing lens satisfies the inequality:

$1.51<N4<1.56$, where N4 denotes the refractive index of the fourth lens with respect to the d-line.

13. The photographing lens of claim 1, wherein the first through fifth lenses are formed as plastic lenses.

14. The photographing lens of claim 1, wherein the photographing lens has an F number ranging from 1.8 to 2.8.

15. The photographing lens of claim 1, wherein the photographing lens has an angle of view ranging from 70° to 85°.

16. The photographing lens of claim 1, wherein an aperture stop is disposed on the object side surface or the image side surface of the first lens.

17. The photographing lens of claim 1, wherein each of the first through fifth lenses has at least one aspherical shape.

18. A photographing apparatus comprising the photographing lens of claim 1 and an image sensor at an image plane of the photographing lens.

* * * * *